(12) United States Patent
Okawara et al.

(10) Patent No.: US 8,658,278 B2
(45) Date of Patent: Feb. 25, 2014

(54) GAS BARRIER MULTILAYER FILM

(75) Inventors: Chiharu Okawara, Ibaraki (JP); Shigenobu Yoshida, Tokyo (JP); Tooru Hachisuka, Ibaraki (JP); Motoyoshi Takemura, Aichi (JP)

(73) Assignee: Mitsubishi Plastics, Inc., Tokyo (JP)

( * ) Notice: Subject to any disclaimer, the term of this patent is extended or adjusted under 35 U.S.C. 154(b) by 749 days.

(21) Appl. No.: 12/065,131

(22) PCT Filed: Aug. 30, 2006

(86) PCT No.: PCT/JP2006/317080
§ 371 (c)(1),
(2), (4) Date: May 4, 2009

(87) PCT Pub. No.: WO2007/026751
PCT Pub. Date: Mar. 8, 2007

(65) Prior Publication Data
US 2009/0214854 A1    Aug. 27, 2009

(30) Foreign Application Priority Data

Aug. 31, 2005 (JP) ................................ 2005-250609
Mar. 31, 2006 (JP) ................................ 2006-097222
Aug. 2, 2006 (JP) ................................ 2006-210823

(51) Int. Cl.
B32B 5/30 (2006.01)

(52) U.S. Cl.
USPC ........................................... 428/323; 525/57

(58) Field of Classification Search
USPC ........................................... 428/323; 525/57
See application file for complete search history.

(56) References Cited

U.S. PATENT DOCUMENTS

| | | | | |
|---|---|---|---|---|
| 4,513,028 | A * | 4/1985 | Aritake | 427/173 |
| 5,112,676 | A * | 5/1992 | Sawada et al. | 428/216 |
| 7,615,287 | B2 * | 11/2009 | Okawara et al. | 428/451 |
| 7,678,448 | B2 * | 3/2010 | Hachisuka et al. | 428/336 |
| 2002/0018883 | A1 | 2/2002 | Okazaki et al. | |
| 2003/0194955 | A1 * | 10/2003 | West et al. | 451/56 |
| 2004/0209352 | A1 * | 10/2004 | Ozaki et al. | 435/287.1 |
| 2005/0129930 | A1 | 6/2005 | Berlin et al. | |
| 2007/0026216 | A1 * | 2/2007 | Weingartner et al. | 428/304.4 |
| 2007/0275236 | A1 * | 11/2007 | Mussig et al. | 428/343 |
| 2009/0022981 | A1 * | 1/2009 | Yoshida et al. | 428/336 |
| 2009/0214854 | A1 | 8/2009 | Okawara et al. | |
| 2009/0317766 | A1 * | 12/2009 | Heidenau et al. | 433/201.1 |

FOREIGN PATENT DOCUMENTS

| | | |
|---|---|---|
| EP | 0698634 | 2/1996 |
| EP | 1170323 | 1/2002 |
| JP | 55-132241 | 10/1980 |
| JP | 05009317 | 1/1993 |
| JP | 08039716 | 2/1996 |
| JP | 08-188682 | 7/1996 |
| JP | 2000185375 | 7/2000 |
| JP | 2001323204 | 11/2001 |
| JP | 2002080614 | 3/2002 |
| JP | 2002138242 | 5/2002 |
| JP | 2002-302150 | 10/2002 |
| JP | 2002361777 | 12/2002 |
| JP | 2003049035 | 2/2003 |
| JP | 2003205582 | 7/2003 |
| JP | 2003277675 | 10/2003 |
| JP | 2003326630 | 11/2003 |
| JP | 2005-138289 | 6/2005 |
| JP | 2005178371 | 7/2005 |
| JP | 2005-225078 | 8/2005 |
| JP | 2005-537147 | 12/2005 |
| JP | 2007-90874 | 4/2007 |
| WO | 2005051651 | 6/2005 |

OTHER PUBLICATIONS

Machine translation of JP 2003-49035.*
Machine Translation of Fujita et al (JP 2003-205582).*
Eka Bindzil. AKZO Nobel. Facts about colloidal silica. Evidentiary Reference, no date required.*
U.S. Appl. No. 13/201,543, filed Sep. 16, 2011, Yoshida, et al.
Supplementary European Search Report issued Feb. 10, 2011 in Application No. EP06821798 filed Aug. 30, 2006.
Japanese Office Action issued Feb. 8, 2011 in Application No. 2006-210823.
Japanese Office Action issued Feb. 8, 2011 in Application No. 2006-233925.
U.S. Appl. No. 13/022,283, filed Feb. 7, 2011, Yoshida, et al.
U.S. Appl. No. 12/992,378, filed Nov. 16, 2010, Yoshida, et al.

* cited by examiner

Primary Examiner — Mike M Dollinger
(74) Attorney, Agent, or Firm — Oblon, Spivak, McClelland, Maier & Neustadt, L.L.P.

(57) ABSTRACT

Provided is a film which can be industrially coated easily and exhibits excellent gas barrier performance without being subjected to a high-temperature heat treatment. The film exhibits good gas barrier performance immediately after the production, and maintains the excellent gas barrier performance while exhibiting excellent hot water resistance and printing resistance. More specifically, provided are: a gas barrier laminated film including a resin layer on an inorganic thin film formed on at least one surface of a support film, the resin layer being formed by applying: (1) an aqueous dispersion containing polyvinyl alcohol (a), an ethylene-unsaturated carboxylic acid copolymer (b), and inorganic particles (c); (2) an aqueous dispersion containing an ethylene-unsaturated carboxylic acid copolymer (b), inorganic particles (c), and/or a cross-linking agent (d); or (3) an aqueous dispersion containing polyvinyl alcohol (a), an ethylene-unsaturated carboxylic acid copolymer (b), inorganic particles (c), and a cross-linking agent (d), to the inorganic thin film surface; and a method of producing the gas barrier laminated film.

28 Claims, No Drawings

GAS BARRIER MULTILAYER FILM

CROSS-REFERENCE TO PRIOR APPLICATION

This is a U.S. National Phase Application under 35 U.S.C. §371 of International Patent Application No. PCT/JP2006/317080 filed Aug. 30, 2006, which claims the benefit of Japanese Application Nos. 2005-250609 filed Aug. 31, 2005, 2006-097222 filed Mar. 31, 2006, and 2006-210823 filed Aug. 2, 2006, all of which are incorporated by reference herein. The International Application was published in Japanese on Mar. 8, 2007 as WO 2007/026751 A1 under PCT Article 21(2).

TECHNICAL FIELD

The present invention relates to a laminated film and a laminate excellent in gas barrier performance, which may suitably be employed as various wrapping materials or the like, and to a method of producing the laminated film and the laminate.

Conventionally, a gas barrier plastic film including a plastic film as a support and an inorganic thin film formed on the surface thereof, which is formed of a material such as silicon oxide, aluminum oxide, or magnesium oxide, is widely employed as a wrapping material for articles which must be isolated from gases such as water vapor and oxygen, for example, a wrapping material for preventing deterioration of food, industrial materials, drugs, and the like. In addition to the wrapping use, in recent years, new use of the gas barrier plastic film as a transparent conductive sheet used for liquid crystal display devices, solar cells, electromagnetic shields, touch panels, EL substrates, color filters, and the like, or as a vacuum insulation material is attracting attention.

Various improvements have been investigated with respect to the gas barrier plastic film formed of the inorganic thin film described above, while aiming to prevent deterioration in gas barrier performance and further improve the gas barrier performance. For example, there have been disclosed: a method involving coating an aqueous dispersion of polyvinyl alcohol and an ethylene-unsaturated carboxylic acid copolymer to the surface of a deposited layer of ceramic (see Patent Document 1); a composite deposited film in which a waterproof film containing a mixture containing polyvinyl alcohol, polycarboxylic acid or a partially neutralized substance thereof is laminated on a deposited film of an inorganic material (see Patent Document 2); a laminate in which a metal oxide sol is coated to a deposited side of a metal oxide deposited plastic film, and a sealant layer is laminated on the coating layer (see Patent Document 3); a method involving providing a coating layer of polyvinyl alcohol on a deposited side (see Patent Document 4); and a method involving coating an aqueous dispersion of an ethylene-unsaturated carboxylic acid copolymer to a deposited side (see Patent Document 5).

However, the above-mentioned methods and films show some improvements in the gas barrier performance, but the methods and films are not sufficient in the following points, for example: the gas barrier performance does not exhibit unless a prolonged high temperature treatment is performed; the gas barrier performance, adhesive strength, or mechanical strength under severe hot water treatment conditions typified by boiling treatment, retorting treatment, etc., and the gas barrier performance (printing resistance) after printed to the side of an inorganic thin film are insufficient; and the suitability for high-speed gravure coating and the like is insufficient. Thus, the improvements in the above-mentioned points have been desired.

Patent Document 1: JP 2003-49035 A
Patent Document 2: JP 08-39716 A
Patent Document 3: JP 05-9317 A
Patent Document 4: JP 2000-185375 A
Patent Document 5: JP 2002-361777 A

DISCLOSURE OF THE INVENTION

Problems to be Solved by the Invention

It is an object of the present invention to provide a film which exhibits high gas barrier performance immediately after the production, and has excellent hot water resistance while maintaining excellent gas barrier performance.

Another object of the present invention is to provide a laminated film which is industrially coated easily, exhibits high gas barrier performance immediately after the production, and has an excellent hot water resistance.

Still another object of the present invention is to provide a film which is industrially coated easily, exhibits high gas barrier performance without being subjected to high-temperature heat treatment, exhibits excellent gas barrier performance immediately after the production, and has an excellent hot water resistance and printing resistance.

Means for Solving the Problems

That is, the present invention relates to:

(1) A gas barrier laminated film including a resin layer which is obtained by applying an aqueous dispersion containing polyvinyl alcohol (a), an ethylene-unsaturated carboxylic acid copolymer (b) and inorganic particles (c) to a surface of an inorganic thin film which is formed on at least one side of a support film (hereinafter, referred to as "first invention");

(2) A gas barrier laminated film including a resin layer which is obtained by applying an aqueous dispersion containing at least one member selected from an ethylene-unsaturated carboxylic acid copolymer (b), inorganic particles (c), and a cross-linking agent (d) to a surface of an inorganic thin film which is formed on at least one side of a support film (hereinafter, referred to as "second invention");

(3) A gas barrier laminated film including a resin layer which is obtained by applying an aqueous dispersion containing polyvinyl alcohol (a), an ethylene-unsaturated carboxylic acid copolymer (b), inorganic particles (c), and a cross-linking agent (d) to an inorganic thin film which is formed on at least one side of a support film (hereinafter, referred to as "third invention"); and (4) A method for producing each of the gas barrier laminated films according to the above items (1) to (3) (hereinafter, collectively referred to as "fourth invention").

Effects of the Invention

According to the first invention, a gas barrier laminated film can be provided which is, for example, excellent in gas barrier performance and adhesive strength after boiling and has excellent mechanical strength, especially easy tearability, due to exhibiting high gas barrier performance immediately after the production and having excellent hot water resistance while maintaining remarkable gas barrier performance.

According to the second invention, a gas barrier laminated film can be provided which is, for example, excellent in gas barrier performance and adhesive strength after boiling and has excellent mechanical strength, such as easy tearability, due to being industrially coated easily, exhibiting high gas barrier performance immediately after the production, and having an excellent hot water resistance.

According to the third invention, a gas barrier laminated film can be provided which is excellent in gas barrier performance and adhesive strength after boiling or retorting, due to being industrially coated easily, such as high-speed gravure coating, exhibiting excellent gas barrier performance without being subjected to high-temperature heat treatment, exhibiting high gas barrier performance immediately after the production, and having excellent printing resistance and hot water resistance.

BEST MODE FOR CARRYING OUT THE INVENTION

Hereinafter, the present invention will be described in detail.

As a support film for each of the gas barrier laminated films according to the first to third inventions (hereinafter, sometimes collectively referred to as "the present invention"), a thermoplastic polymer film is preferable. Any resin which can be used for usual wrapping materials can be used as a raw material thereof without limitation. Specific examples include: polyolefins such as homopolymers and copolymers of ethylene, propylene, and butene; amorphous polyolefins such as cyclic polyolefin; polyesters such as polyethylene terephthalate and polyethylene-2,6-naphthalate; polyamides such as nylon 6, nylon 66, nylon 12, and copolymer nylon; polyvinyl alcohols; ethylene-vinyl acetate copolymer partial hydrolysates (EVOH); polyimides; polyether-imides; polysulfones; polyether-sulfones; polyether-ketones; polycarbonates; polyvinyl butyrals; polyarylates; fluororesins; acrylate resins; and biodegradable resins. Of those, polyesters, polyamides, and polyvinyl alcohols are preferred from the viewpoint of film strength, cost, etc.

The aforementioned support film may contain known additives such as an antistatic agent, a light-blocking agent, a UV-absorber, a plasticizer, a lubricant, a filler, a colorant, a stabilizer, a lubricant, a cross-linking agent, an anti-blocking agent, and an antioxidant.

A thermoplastic polymer film used as a support film is produced through molding the aforementioned raw materials. When employed as a support, the film may be unstretched or stretched. The film may be laminated with other plastic supports. The support film can be produced through any of conventionally known methods. For example, a resin raw material is melted by means of an extruder and extruded through a circular die or T die set, followed by quenching, to thereby produce an unstretched film which is virtually amorphous and non-oriented. The unstretched film is stretched in a film flow direction (longitudinal direction) and/or in the film flow direction and an orthogonal direction thereto (transverse direction) through a known method such as monoaxial stretching, tenter-based successive biaxial stretching, tenter-based simultaneous biaxial stretching, or tubular simultaneous biaxial stretching, to thereby produce a film stretched at least in one axial direction.

The support film generally has a thickness of 5 to 500 µm, preferably 10 to 200 µm, selected from the viewpoint of mechanical strength, flexibility, transparency, etc., of the gas barrier laminated film support of the present invention depending on the use of the support film. The support film includes a sheet-like film having a large thickness. No particular limitation is imposed on the width and length of the film, and these dimensions may be appropriately selected in accordance with the use thereof.

Preferably, an anchor coating agent is applied onto the aforementioned support film in order to enhance adhesion with the inorganic thin film. Examples of the anchor coating agent include solvent or aqueous polyester resins, urethane resins, acrylic resins, vinyl alcohol resins, ethylene-vinyl alcohol resins, vinyl-modified resins, oxazoline group-containing resins, carbodiimide group-containing resins, epoxy group-containing resins, isocyanate group-containing resins, alkoxyl group-containing resins, modified styrene resins, modified silicone resins, and alkyl titanate. Any one of the anchor coating agents may be used independently or two or more agents may be used in combination. Of those, from the viewpoint of adhesion and hot water resistance, it is preferable to employ at least one member selected from polyester resins, urethane resins, acrylic resins, oxazoline group-containing resins, carbodiimide group-containing resins, epoxy group-containing resins, isocyanate containing resins, and their copolymers. It is more preferable to employ a combination of at least one member of polyester resins, urethane resins, and acrylic resins and at least one member of oxazoline group-containing resins, carbodiimide group-containing resins, epoxy group-containing resins, and isocyanate group-containing resins.

An anchor coat layer preferably has a thickness of 0.005 to 5 µm, more preferably 0.01 to 1 µm. The thickness is preferably within the above range, because excellent lubricity is realized, peeling of the anchor coat layer from the support film due to inside stress of the anchor coat layer is difficult to occur, and uniform thickness can be maintained.

In order to improve applicability and adhesion of the anchor coating agent to the support film, the film may be subjected to customary surface treatment such as chemical treatment or discharge treatment before application of the anchor coating agent.

Examples of the inorganic substance for forming the inorganic thin film provided on at least one surface of the support film include silicon, aluminum, magnesium, zinc, tin, nickel, titanium, hydrocarbons, oxides thereof, carbides thereof, nitrides thereof, and mixtures thereof. Of those, silicon oxide, aluminum oxide, and hydrocarbon (for example, a substance predominantly formed of hydrocarbon such as diamond-like carbon). In particular, silicon oxide or aluminum oxide is preferred in that high gas barrier performance can be consistently maintained.

As a method of producing the inorganic thin film, any methods such as vapor deposition and coating may be employed. Of those, vapor deposition is preferred in that a uniform thin film exhibiting high gas barrier performance can be produced. Examples of vapor deposition techniques include PVD (physical vapor deposition) and CVD (chemical vapor deposition), such as vacuum vapor deposition, ion plating, and sputtering.

The inorganic thin film generally has a thickness of 0.1 to 500 nm, preferably 0.5 to 40 nm. When the thickness falls within the above range, sufficient gas barrier performance can be attained, and the inorganic thin film has no cracks and peeled parts and also exhibits excellent transparency.

The resin layer provided on the inorganic thin film is obtained by applying: an "aqueous dispersion containing polyvinyl alcohol (a), an ethylene-unsaturated carboxylic acid copolymer (b), and inorganic particles (c)" (hereinafter sometimes referred to as "aqueous dispersion 1 of the present invention"); an "aqueous dispersion containing at least one member selected from an ethylene-unsaturated carboxylic acid copolymer (b), inorganic particles (c), and a cross-linking agent (d) (hereinafter sometimes referred to as "aqueous dispersion 2 of the present invention"), or an "aqueous dispersion containing polyvinyl alcohol (a), an ethylene-unsaturated carboxylic acid copolymer (b), inorganic particles (c), and a cross-linking agent (d)" (hereinafter sometimes referred to as "aqueous dispersion 3 of the present invention") (those above are hereinafter sometimes collectively referred to as "aqueous (dispersion) solution of the present invention"). The aqueous (dispersion) solution of the present invention and the resin layer having the aqueous (dispersion) solution applied thereonto are described below.

First Invention

The aqueous dispersion 1 of the present invention contains polyvinyl alcohol (a), an ethylene-unsaturated carboxylic acid copolymer (b), and inorganic particles (c).

(a) Polyvinyl Alcohol (PVA)

Polyvinyl alcohol can be obtained by known methods, and can be usually obtained by saponifying a polymer of vinyl acetate. Polyvinyl alcohol whose degree of saponification is 80% or more can be used. The degree of saponification is preferably 90% or more, more preferably 95% or more, and still more preferably 98% or more from the viewpoint of gas barrier performance.

The average degree of polymerization is usually 200 to 3,500, and, from the viewpoint of gas barrier performance, strength, and coating properties, is preferably 300 to 2,000, and more preferably 500 to 1,500. As polyvinyl alcohol, a substance obtained by copolymerizing ethylene at 40% or less and a substance obtained by modifying carboxyl or the like can be used. The degree of saponification and the average degree of polymerization can be measured according to JIS K 6726 (polyvinyl alcohol test method).

An aqueous solution of polyvinyl alcohol can be prepared by, for example, supplying polyvinyl alcohol resin while stirring in ordinary temperature water, increasing the temperature, and stirring the resultant at 80 to 95° C. for 30 to 60 minutes.

(b) Ethylene-Unsaturated Carboxylic Acid Copolymer

An ethylene-unsaturated carboxylic acid copolymer is a copolymer of ethylene with unsaturated carboxylic acid, such as acrylic acid, methacrylic acid, ethacrylic acid, fumaric acid, maleic acid, itaconic acid, maleic acid monomethyl, maleic acid monoethyl, maleic anhydride, and itaconic anhydride. Of those, a copolymer of ethylene with acrylic acid or methacrylic acid is preferable from the viewpoint of versatility. This ethylene-unsaturated carboxylic acid copolymer may suitably contain another monomer.

The content of ethylene in the ethylene-unsaturated carboxylic acid copolymer is preferably 65 to 90 mass %, and more preferably 70 to 85 mass %, and the content of the unsaturated carboxylic acid component is preferably 10 to 35 mass %, and more preferably 15 to 30 mass % from the viewpoint of versatility and plasticity. The melt flow rate (MFR) under 2.16 kg load at 190° C. prescribed in JIS K 7210 (testing method of melt mass-flow rate and melt volume-flow rate of plastic-thermoplastic plastic) of the ethylene-unsaturated carboxylic acid copolymer is preferably 30 to 2,000 g/10 minutes, more preferably 60 to 1,500 g/10 minutes, and still more preferably 80 to 1,200 g/10 minutes from the viewpoint of bending resistance of a film. The number average molecular weight is preferably in the range of 2,000 to 250,000.

Mentioned as other monomer components which may be contained in the ethylene-unsaturated carboxylic acid copolymer are: substances derived from vinyl ester such as vinyl acetate and vinyl propionate; unsaturated carboxylic acid ester such as methyl acrylate, ethyl acrylate, isopropyl acrylate, n-butyl acrylate, isobutyl acrylate, isooctyl acrylate, methyl methacrylate, isobutyl methacrylate, dimethyl maleate, and diethyl maleate; carbon monoxide; and sulfur dioxide. These monomer components can be contained in a proportion of 0 to 50 mass %. Such an ethylene-unsaturated carboxylic acid copolymer can be obtained by known methods, such as radical polymerization under high temperatures and high pressures.

In the present invention, from the viewpoint of gas barrier performance, interlayer adhesion, etc., it is preferable for the above-mentioned ethylene-unsaturated carboxylic acid copolymer to contain its neutralized substances. The degree of neutralization of the ethylene-unsaturated carboxylic acid copolymer is preferably 10 to 100%, more preferably 20 to 100%, and particularly preferably 40 to 100% from the viewpoint of gas barrier performance. The degree of neutralization can be calculated according to the following equation.

Degree of neutralization=$(A/B) \times 100 (\%)$

A: Number of moles of a neutralized carboxyl group in 1 g of neutralized ethylene-unsaturated carboxylic acid copolymer B: Number of moles of a carboxyl group in 1 g of ethylene-unsaturated carboxylic acid copolymer before neutralizing For convenience, in the case of an aqueous dispersion, the degree of neutralization can be calculated by defining the above A as a number obtained by (the number of metal ions in a solvent)×(the valence of the metal ions) and defining the above B as the number of carboxyl groups in the ethylene-unsaturated carboxylic acid copolymer before neutralizing.

As the partial neutralized substance of ethylene-unsaturated carboxylic acid copolymer, from the viewpoint of effects on polyvinyl alcohol and/or inorganic particles, alkaline metal salts of ethylene-unsaturated carboxylic acid copolymer are preferable, and lithium salt, potassium salt, sodium salt, etc. are mentioned as the alkaline metal salt.

From the viewpoint of gas barrier performance, it is preferable to use the ethylene-unsaturated carboxylic acid copolymer of the present invention in the form of an aqueous dispersion containing the above-mentioned copolymer and a dispersion medium containing at least one member selected from ammonia, sodium hydroxide, potassium hydroxide, lithium hydroxide, etc. An aqueous dispersion containing the dispersion medium in such a manner as to satisfy the above-mentioned degree of neutralization with respect to the total number of moles of the carboxyl group contained in the ethylene-unsaturated carboxylic acid copolymer is used.

An aqueous dispersion can be produced by using the ethylene-unsaturated carboxylic acid copolymer and the dispersion medium by supplying water and the above-mentioned raw materials in predetermined amounts in a container, in which the mixture can be stirred, and stirring the mixture at 90 to 150° C. for ten minutes to about 2 hours. The aqueous dispersion thus obtained is excellent in stability and does not show remarkable changes in the particle diameter and the viscosity even when stored for a long period of time.

In the present invention, the ethylene-unsaturated carboxylic acid copolymer may further contain a divalent or trivalent metal. Such a divalent or trivalent metal can be dispersed by adding as an oxide with a dispersion medium when producing an aqueous dispersion. Such a divalent or trivalent metal can be introduced in the form of carbonic acid metal salt or sulfuric acid metal salt besides in the form of an oxide. Such a divalent or trivalent metal can be introduced in a proportion of 0 to 60 mol % with respect to the number of moles of the carboxyl group of the ethylene-unsaturated carboxylic acid copolymer.

In the present invention, the ethylene-unsaturated carboxylic acid copolymer can be used alone or in combination of two or more thereof.

(c) Inorganic Particles

There is no limitation on inorganic particles used for the present invention, and, for example, known substances such as an inorganic filler, an inorganic laminar compound, and a metal oxide sol can be used.

Examples of the inorganic filler include an oxide, hydroxide, hydrate, and carbohydrate of silicon, aluminum, magnesium, calcium, potassium, sodium, titanium, zinc, and iron, and their mixtures and composites.

Examples of the inorganic laminar compound include clay minerals typified by a kaolinite group, smectite group, and mica group. Among the clay minerals, montmorillonite, hectorite, saponite, and the like may be used.

Examples of the metal oxide sols include metal oxides such as silicon, antimony, zirconium, aluminium, cerium, and titanium, or their mixtures. Of those, substances containing a reactive functional group that can be subjected to hydrolysis condensation, such as hydroxyl groups and alkoxy groups, are preferable from the viewpoint of hot water resistance and gas barrier performance. In particular, substances having a silanol group in the reactive functional group in a proportion of preferably 10 to 100 mol % and more preferably 20 to 100 mol % are used.

In the present invention, silica particles are preferable from the viewpoint of versatility and stability as the above-mentioned inorganic particles. The above-mentioned inorganic particles can be used alone or in combination of two or more thereof.

The average particle diameter of inorganic particles has a lower limit of preferably 0.5 nm and more preferably 1 nm, and has a upper limit of preferably 2 μm, more preferably 200 nm, still more preferably 100 nm, still more preferably 25 nm, still more preferably 10 nm, and further still more preferably 5 nm with view to the hot water resistance and cohesive failure resistance. Specifically, the average particle diameter is preferably 0.5 to 2 μm, more preferably 0.5 to 200 nm, still more preferably 0.5 to 100 nm, still more preferably 0.5 to 25 nm, still more preferably 1 to 20 nm, still more preferably 1 to 10 nm, and further still more preferably 1 to 5 nm.

The average particle diameter of the inorganic particles can be measured by various methods, such as a nitrogen gas-adsorbing method (BET), electron microscope observation, small-angle X-ray scattering method, and dynamic light scattering method. In the present invention, a value measured by a dynamic light scattering method is employed.

In order to impart hot water resistances such as boiling resistance and retort resistance, and easy tearability, a high compatibility with resin in a molecular level and a moderate cohesiveness are required. In order to achieve the properties, it is preferable that an inorganic component is in the form of particles, have a small particle diameter, and have a hydroxyl group. From the above-mentioned viewpoints, inorganic particles having a hydroxyl group and an average particle diameter of 0.5 to 200 nm, 1 to 200 nm, or 1 to 100 nm are preferable.

There is no limitation on the preparation methods of the inorganic particles. For example, the inorganic particles can be prepared by a method described in WO 95/17349, on page 2, line 16 to page 10, line 26, or in JP 06-16414 A, paragraphs [0012] to [0031], and more specifically, a method involving hydrolyzing alkoxysilane and aging and/or a method involving dissolving a water glass, exchanging ions, and condensing. The calculation of the proportion of the functional groups in the case of the former preparation method can be performed by a method described in, for example, the above-mentioned WO 95/17349 on page 15, line 19 to page 16, line 8, and in the case of the latter preparation method, a silanol group can be estimated to be 100 mol %.

In general, as the use of alkoxysilane, it is known that a coating solution in which alkoxysilane or its hydrolyzate is mixed in a resin is applied onto an inorganic thin film. However, since alkoxysilane and its hydrolysate have extremely strong cohesion stress, the inorganic thin film is damaged, thereby lowering the gas barrier performance. The tendency is remarkable under hot water treatment. According to the present invention, the interaction and the cohesion ability with a resin component of a coating layer can be adjusted by the use of a substance obtained by subjecting alkoxysilane to hydrolysis condensation and aging the resultant for sufficiently advancing a partial crosslinking reaction to thereby form silica into particles, and, preferably, introducing a silanol group.

In the first invention, in a resin layer obtained by applying an aqueous dispersion containing polyvinyl alcohol (a), an ethylene-unsaturated carboxylic acid copolymer (b), and inorganic particles (c), it is preferable to contain the polyvinyl alcohol (a) in a proportion of preferably 10 to 95 mass %, and more preferably 20 to 90 mass % with respect to a total solid content of the component (a), the component (b), and the component (c) from the viewpoint of gas barrier performance and printing resistance. From the viewpoint of gas barrier performance, hot water-resistant adhesion, it is preferable to contain the ethylene-unsaturated carboxylic acid copolymer (b) in a proportion of preferably 3 to 80 mass %, and more preferably 5 to 40 mass %. From the viewpoint of hot water resistance and easy tearability, it is preferable to contain the inorganic particles (c) in a proportion of preferably 2 to 80 mass %, and more preferably 2 to 50 mass %. The content of each component in the aqueous dispersion may be adjusted in such a manner as to fall under the above-mentioned ranges for the resin layer, and the same contents as those mentioned above are preferable.

In the aqueous dispersion 1 of the present invention, it is preferable that a content ratio [(a)/(b)] of the polyvinyl alcohol (a) and the ethylene-unsaturated carboxylic acid copolymer (b) be 95/5 to 25/75, further, 80/20 to 50/50 in solid-content mass ratio. Thus, when such an aqueous dispersion is applied onto the deposited side of an inorganic thin film, a multilayer deposited film can be obtained which has a function of protecting the deposited side, exhibits high gas barrier performance immediately after the production, and is excellent in adhesion properties with adhesives and an adhesive resin layer.

There is no limitation on the preparation methods of the aqueous dispersion of the present invention. For example, the aqueous dispersion of the present invention can be prepared by: a method involving dissolving each polymer in water, and then adding inorganic particles or an aqueous solution thereof to the solution; a method involving mixing an aqueous solution of each polymer and inorganic particles or an aqueous solution thereof; a method involving polymerizing each monomer in an aqueous polyvinyl alcohol solution, and then adding inorganic particles or an aqueous solution thereof; a method involving polymerizing each monomer in an aqueous polyvinyl alcohol solution, neutralizing the resultant with alkali, and adding inorganic particles or an aqueous solution thereof to the resultant; and the like. In the above-mentioned case, a mixture may be prepared using a solvent other than water, such as alcohols.

Second Invention

An aqueous dispersion 2 of the present invention contains at least one member selected from an ethylene-unsaturated carboxylic acid copolymer (b), inorganic particles (c), and a cross-linking agent (d).

As for the ethylene-unsaturated carboxylic acid copolymer (b) and the inorganic particles (c), the same substances as mentioned in the first invention above can be used.

(d) Cross-Linking Agent

There is no limitation on the cross-linking agent, insofar as it is a compound which reacts with a reactive functional group of the ethylene-unsaturated carboxylic acid copolymer (b), and can crosslink them. For example, various compounds having various groups corresponding to the reactive functional groups can be mentioned.

Mentioned as the reactive functional groups of the ethylene-unsaturated carboxylic acid copolymer (b) are various functional groups, such as carboxyl groups, carboxylic acid groups in the form of salt, and functional groups having another active hydrogen by another component which is, as required, further copolymerized. As a crosslinkable functional group in the cross-linking agent, groups capable of reacting with the reactive functional group of the ethylene-unsaturated carboxylic acid copolymer are mentioned. For example, a carbodiimide group, an oxazoline group, an isocyanate group, an epoxy group, a methylol group, an aldehyde group, an acid anhydride group, and an aziridinyl group are mentioned. From the viewpoint of stability of the mixed aqueous dispersion, the carbodiimide group, the oxazoline group, the isocyanate group, or the epoxy group is preferable. With respect to these crosslinkable functional groups, one crosslinkable functional group may be introduced in a single molecule, and two or more crosslinkable functional groups may be introduced therein. From the viewpoint of crosslinking ability, it is important that two or more crosslinkable functional groups are introduced in a single molecule.

As the cross-linking agent, an aqueous polymer having the above-mentioned crosslinkable functional group is preferable. In particular, an aqueous polymer is suitable which has, in its molecules, two or more oxazoline groups, carbodiimide groups, epoxy groups, isocyanate groups, etc., which are excellent in reactivity with a carboxyl group and a carboxylic acid group in the form of salt of the ethylene-unsaturated carboxylic acid copolymer and impart a crosslinked resin layer having a desired performance.

As the aqueous polymer having two or more oxazoline groups in its molecules, substances obtained by polymerizing an oxazoline group-containing monomer (i) and, as required, an ethylenic unsaturated monomer (ii) can be used.

Here, examples of the oxazoline group-containing monomer (i) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. Those compounds may be used alone or two or more kinds thereof may be used in combination. Of those, 2-isopropenyl-2-oxazolin is suitable owing to easiness of industrial availability.

On the other hand, there is no limitation on the ethylenic unsaturated monomer (ii) which is used as required insofar as it is a monomer which does not react with an oxazoline group and can be copolymerized with the component (i). For example, mentioned are: (meth)acrylates such as methyl (meth)acrylate, butyl(meth)acrylate, 2-ethylhexyl(meth) acrylate, methoxypolyethylene glycol(meth)acrylate, 2-hydroxyethyl(meth)acrylate, 2-aminoethyl(meth)acrylate, and salts thereof; unsaturated nitriles such as (meth)acrylonitrile; unsaturated amides such as (meth)acrylamide, N-methylol (meth)acrylamide, and N-(2-hydroxyethyl)(meth)acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride, and vinyl fluoride; and α,β-unsaturated aromatic monomers such as styrene, α-methyl styrene, and sodium styrenesulfonate. The above-mentioned substances may be used alone or in combination of two or more thereof.

The aqueous polymer having two or more oxazoline groups in its molecules can be produced by subjecting the oxazoline group-containing monomer (i) and, as required, the ethylenic unsaturated monomer (ii) to solution polymerization in aqueous medium according to known polymerization methods. Here, as the aqueous medium, water and a mixture of water and an organic solvent having compatibility with water, such as methanol, ethanol, propanol, isopropanol, butanol, tertiary butanol, ethyleneglycol, ethyleneglycol monomethyl ether, ethylene glycol monobutyl ether, diethyleneglycol, acetone, and methylethyl ketone, are mentioned.

The amount of the oxazoline group-containing monomer (i) is not limited, and is preferable that the amount is 5 masse or more based on the total amount of the monomer. When the amount of the oxazoline group-containing monomer (i) is 5 mass % or more, the content of the crosslinkable functional group in a polymer becomes sufficient, whereby the effect as a cross-linking agent is satisfactorily demonstrated.

In order to convert this polymer to an aqueous polymer, the proportion of a hydrophilic monomer is preferably 50 mass % or more, and particularly preferably 70 mass % or more, based on the total monomers. Examples of the hydrophilic monomer include 2-hydroxyethyl(meth)acrylate, methoxypolyethylene glycol (meth)acrylate, 2-aminoethyl(meth) acrylate, salts of 2-aminoethyl(meth)acrylate, (meth)acrylamide, N-methylol(meth)acrylamide, N-(2-hydroxyethyl) (meth)acrylamide, or styrene sodium sulfonate, which is included in an oxazoline group-containing monomer (i) and an ethylenic unsaturated monomer (ii).

In the present invention, as the aqueous polymer having two or more oxazoline groups in its molecules, substances in which the oxazoline group is introduced by post-modification of the polymer can be used. The oxazoline group can be introduced by, for example, a reaction between a nitrile group and an aminoethanol group, dehydration of a hydroxyl alkylamide group and the like.

In order to produce an aqueous polymer having two or more carbodiimide groups in its molecules, a polymer containing an isocyanate-terminated carbodiimide group is produced by a condensation reaction accompanied by decarboxylation reaction of a diisocyanate compound, for example.

Examples of the diisocyanate compound include 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate. Those compounds may be used alone or two or more kinds thereof may be used in combination.

By the use of a compound which reacts with a terminated-isocyanate group, such as a mono-isocyanate compound, together with the diisocyanate compound molecules can be controlled to a suitable degree of polymerization. As a mono-isocyanate compound for sealing a terminal end and controlling a degree of polymerization, phenyl isocyanate, tolyl isocyanate, cyclohexylisocyanate, dimethylphenyl isocyanate, butylisocyanate, and naphthyl isocyanate are mentioned, for example. In addition to the above, usable as an end sealant are active hydrogen-containing compounds which can react with an isocyanate group, such as aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamine alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodium hydroxypropanesulfonate); a mixture of polyethylene oxide or polyethylene oxide, whose terminal is capped with an alkoxy group, and a polypropylene oxide (e.g., polyethylene oxide whose terminal position is capped with a methoxy group or an ethoxy group); etc.

As an aqueous cross-linking agent containing an epoxy group, there are exemplified sorbitol polyglycidyl ether, (poly)glycerol polyglycidyl ether, trimethylolpropane polyglycidyl ether, (poly)ethylene glycol diglycidyl ether, (poly)propylene glycol diglycidyl ether, phenol ethyleneoxide glycidyl ether, and lauryl alcohol ethyleneoxide glycidyl ether.

In addition to the above, mentioned as examples are: a water-soluble epoxy resin obtained by reacting a carboxy-containing compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules.

Mentioned as the polyoxyethylene polyol compound is, for example, polyoxyethylene polyol represented by General Formula R [(OCH$_2$CH$_2$)$_m$OH]$_n$ (R represents a polyhydric alcohol residue, a polynuclear polyhydric phenol residue, and a polyhydric carboxylic acid residue having n pieces of active hydrogen groups).

Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, haxahydrophthalic anhydride, and methyl hexahydrophthalic anhydride, and most preferably hexahydrophthalic anhydride.

There is no limitation on the epoxy resin having two or more epoxy groups in its molecules, and all known epoxy resins can be used. The following substances can be mentioned as a preferable epoxy resin. There are exemplified: polyglycidyl ether of an epoxy resin, phenol novolac resin, and cresol novolac resin which are obtained from epichlorhydrin or β-methyl epichlorhydrin and bisphenol A, bisphenol F, or bisphenol sulfone; polyglycidyl ether of alkylene oxide-added bisphenol A; polyglycidyl ethers of polyalcohols such as polypropylene glycol, 1,6-hexanediol, trimethylol propane, and glycerin; and polyglycidyl ester and polyglycidyl amine of polycarboxylic acids such as adipic acid, phthalic acid, and dimer acid. Further, an epoxy resin, in which the above-mentioned epoxy resin is modified with polyphenols such as bisphenol A and bisphenol F, or polycarboxylic acid such as adipic acid and sebacic acid, can be preferably used.

Mentioned as an aqueous cross-linking agent containing an isocyanate group are, for example: polyisocyanate mainly containing at least one member selected from the group consisting of an isocyanurate group-containing polyisocyanate, an urethodione group-containing polyisocyanate, an urethodione group/isocyanurate group-containing polyisocyanate, an urethane group-containing polyisocyanate, an allophanate group-containing polyisocyanate, a buret group-containing polyisocyanate, a carbodiimide group-containing polyisocyanate, and an uretonimine group-containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three polyethylene oxide units with fatty acid ester in which the sum of the number of carbons of fatty acid and a hydroxyl containing compound as raw materials is 8 or more and which has at least one active hydrogen group which can react with an isocyanate group.

In addition to the above, an urethane group-containing polyisocyanate obtained by reaction between 1,6-hexamethylene diisocyanate and/or an isophorone diisocyanate and an active hydrogen group-containing compound or polyisocyanate (isocyanate modified substance) obtained by an allophanatization reaction, carbodiimidization reaction, uretoniminization reaction, and biuretization reaction of these diisocyanate compounds can be mentioned.

It is preferable that an aqueous dispersion 2 according to the second invention include, as an aqueous dispersion 2-1, a substance which contains an ethylene-unsaturated carboxylic acid copolymer (b) and the inorganic particles (c) and in which the content ratio thereof is 95/5 to 25/75 in a mass ratio of (b)/(c) based on solid content. To be specific, it is preferable for a resin layer to be formed to contain the inorganic particles (c) in a proportion of 5 to 75 mass % based on the total solid content of the components (b) and (c). Thus, a resin layer having desired physical properties can be formed on the surface of an inorganic thin film, thereby achieving the object of the present invention. The mass ratio (b)/(c) based on solid content is more preferably 90/10 to 30/70.

It is preferable that the aqueous dispersion 2 according to the second invention include, as an aqueous dispersion 2-2, a substance which contains the ethylene-unsaturated carboxylic acid copolymer (b) and the cross-linking agent (d) and in which the content ratio thereof is 97/3 to 50/50 in a mass ratio of (b)/(d) based on solid content. To be specific, it is preferable for a resin layer to be formed to contain the cross-linking agent (d) in a proportion of 3 to 50 mass % based on the total solid content of the components (b) and (d). Thus, a resin layer having desired physical properties can be formed on the surface of an inorganic thin film, thereby achieving the objects of the present invention. The mass ratio of (b)/(d) based on solid content is more preferably 90/10 to 60/40.

On the other hand, it is preferable that the aqueous dispersion 2 according to the second invention include, as an aqueous dispersion 2-3, a substance which contains the ethylene-unsaturated carboxylic acid copolymer (b), the inorganic particles (c), and the cross-linking agent (d) and in which the inorganic particles (c) are contained in a proportion of 5 to 75 mass % and the cross-linking agent (d) is contained in a proportion of 3 to 50 mass % (in a resin layer to be formed) based on the total solid content of the components (b), (c) and (d). In that case, a mass ratio of [(d)/(c)] based on solid content of the inorganic particles (c) to the cross-linking agent (d) is preferably 0.1 to 10, and more preferably 0.1 to 5. Thus, a resin layer having desired physical properties can be formed on the surface of an inorganic thin film, thereby achieving the objects of the present invention. It is more preferable that the inorganic particles be contained in a proportion of 10 to 65 mass % and/or the cross-linking agent be contained in a proportion of 5 to 40 mass % based on the total solid content.

The aqueous dispersion 2 of the present invention is not limited in the preparation method, and can be prepared by, for example, the following methods.

First, an aqueous dispersion (z) containing the ethylene-unsaturated carboxylic acid copolymer and a dispersion medium containing ammonia and/or alkali metal hydroxide. The aqueous dispersion 2-1 can be prepared by homogeneously mixing the aqueous dispersion (z) and inorganic particles or an aqueous dispersion thereof. The aqueous dispersion 2-2 can be prepared by homogeneously mixing the aqueous dispersion (z) and a cross-linking agent containing a water-soluble polymer having two or more crosslinkable functional groups in its molecules or an aqueous solution thereof.

The aqueous dispersion 2-3 can be prepared by homogeneously mixing the aqueous dispersion (z), inorganic particles or an aqueous solution thereof, and a cross-linking agent containing a water-soluble polymer having two or more crosslinkable functional groups or an aqueous solution thereof.

Third Invention

The aqueous dispersion 3 of the present invention contains polyvinyl alcohol (a), an ethylene-unsaturated carboxylic acid copolymer (b), inorganic particles (c), and a cross-linking agent (d).

As for the polyvinyl alcohol (a), the ethylene-unsaturated carboxylic acid copolymer (b), the inorganic particles (c), and the cross-linking agent (d), the same substances as mentioned above for the first invention or the second invention can be used. As the cross-linking agent (d), compounds which react with the polyvinyl alcohol (a) and/or a reactive functional group of the ethylene-unsaturated carboxylic acid copolymer (b) and can crosslink them can be used without limitation, and compounds having various groups corresponding to the above-mentioned reactive functional groups, which are the same as in the second invention.

In the third invention, a resin layer obtained by applying an aqueous dispersion containing polyvinyl alcohol (a), an ethylene-unsaturated carboxylic acid copolymer (b), inorganic particles (c), and a cross-linking agent (d) is contained. From the viewpoint of gas barrier performance and printing resistance, it is preferable for the resin layer to contain the polyvinyl alcohol (a) in a proportion of preferably 5 to 70 mass %, and more preferably 10 to 30 mass %, based on the total solid content of the components (a), (b), (c), and (d) From the view point of gas barrier performance, high-speed gravure coating ability, and hot water-resistant adhesion, the ethylene-unsaturated carboxylic acid copolymer (b) is contained in a proportion of preferably 10 to 70 mass %, and more preferably 20 to 60 mass %. From the viewpoint of high-speed gravure coating ability, printing-resistance, and hot water-resistant adhesion, the inorganic particles (c) are contained in a proportion of preferably 20 to 70 mass %, and more preferably 30 to 60 mass %. From the viewpoint of hot water resistance, the cross-linking agent (d) is contained in a proportion of preferably 2 to 30 mass %, and more preferably 3 to 10 mass %. The content of each component in the aqueous dispersion may fall under the range of the above-mentioned contents in the resin layer, and from the same viewpoint, the amount of each component is preferably the same as that mentioned above.

Considering the above, in the present invention, the content ratio [(a)/(b)] of the polyvinyl alcohol (a) and the ethylene-unsaturated carboxylic acid copolymer (b) is preferably 90/10 to 5/95, more preferably 80/20 to 10/90, and still more preferably 60/40 to 20/80 in a mass ratio based on solid content from the viewpoint of barrier properties and adhesion after printing and/or hot water treatment and high-speed coating ability.

The content ratio [((a)+(b))/(c)] of the inorganic particles (c) with respect to the total amount of the polyvinyl alcohol (a) and the ethylene-unsaturated carboxylic acid copolymer (b) is preferably 25/75 to 90/10, more preferably 40/60 to 85/15, and still more preferably 50/50 to 75/25 in a mass ratio based on solid content from the viewpoint of adhesion after printing and/or hot water treatment and high-speed coating ability.

The content ratio (b)/(d) of the cross-linking agent (d) to the ethylene-unsaturated carboxylic acid copolymer (b) is preferably 98/2 to 40/60, more preferably 95/5 to 70/30, and still more preferably 93/7 to 80/20 in a mass ratio based on solid content from the viewpoint of barrier properties after hot water treatment and high-speed coating ability.

There is no limitation on the preparation methods of the aqueous dispersion 3 of the present invention. The aqueous dispersion 3 of the present invention can be prepared by, for example: a method involving dissolving each resin in water, and adding, to the solution, inorganic particles or an aqueous solution thereof and a cross-linking agent containing an aqueous polymer having two or more crosslinkable functional groups or an aqueous solution thereof; a method involving mixing an aqueous solution of each resin, inorganic particles or an aqueous solution thereof, and a cross-linking agent containing an aqueous polymer having two or more crosslinkable functional groups or an aqueous solution thereof; a method involving polymerizing each monomer in an aqueous polyvinyl alcohol solution, and thereafter adding inorganic particles or an aqueous solution thereof and a cross-linking agent containing an aqueous polymer having two or more crosslinkable functional groups or an aqueous solution thereof; and a method involving polymerizing each monomer in a polyvinyl alcohol solution, neutralizing the resultant with an alkali, and adding, to the resultant, inorganic particles or an aqueous solution thereof and a cross-linking agent containing an aqueous polymer having two or more crosslinkable functional groups or an aqueous solution thereof. In the above-mentioned cases, a mixture may be prepared using a solvent other than water, such as alcohols.

First, Second, and Third Inventions

Various known additives can be added, as required, to the aqueous (dispersion) solution of the present invention. Examples of the additive include: polyalcohols such as glycerin, ethylene glycol, polyethylene glycol, and polypropylene glycol; a silane coupling agent; lower alcohols such as methanol, ethanol, normal propanol, and isopropanol; ethers such as ethyleneglycol monomethyl ether, propylene glycol monomethyl ether, propylene glycol diethyl ether, diethylene glycol monoethyl ether, and propylene glycol monoethyl ether; esters such as propylene glycol monoacetate and ethylene glycol monoacetate; an antioxidant; a weathering stabilizer; a UV-absorber; an antistatic agent; a pigment; a dye; an antibacterial agent; a lubricant; an inorganic filler; an antiblocking agent; and an adhesive agent.

The aqueous (dispersion) solution of the present invention can also be mixed with an aqueous dispersion of another resin for use. Examples of the resin aqueous dispersion include one or two or more kinds of aqueous dispersions selected from polyvinyl acetate, ethylene-vinyl acetate copolymer, polyvinyl chloride, polyvinylidene chloride, an acrylic resin, an acrylamide resin, a methacrylamide resin, an acrylonitrile resin, a styrene-acrylic acid copolymer, a polyurethane resin, a styrene-maleic acid copolymer, a styrene-butadiene copolymer, a high impact polystyrene resin, a butadiene resin, a polyester resin, an acrylonitrile-butadiene copolymer, a polyethylene resin, an oxidized polyethylene resin, a propylene-ethylene copolymer, a maleic anhydride-grafted propylene-ethylene copolymer, chlorinated polyethylene, chlorinated polypropylene, EPDM, a phenolic resin, and a silicone resin.

Known coating methods are suitably employed for the application of the aqueous (dispersion) solution of the present invention to the surface of an inorganic thin film. For example, any methods such as reverse roll coater, gravure coater, rod coater, air doctor coater, spraying, or coating methods using a brush can be employed. The coating may be effected by dipping a deposited film in the aqueous dispersion of the present invention. In the present invention, excellent coating ability can be achieved also by high-speed gravure coating. After the coating, moisture can be evaporated using known drying methods such as drying by heating (e.g., hot-air drying at a temperature of about 80 to 200° C. and hot roll drying), and infrared drying. Thus, a laminated film having a uniform coating resin layer is obtained.

In the laminated film of the present invention, the thickness of a resin layer is not limited. The thickness of a resin layer is usually 0.05 to 20 μm, and from the viewpoints of printing gradient and cost, is preferably 0.05 to 10 μm, and more preferably 0.1 to 2 μm. In order to improve water resistance and durability, this resin layer can be subjected to crosslinking treatment by electron beam irradiation.

As the gas barrier laminated film of the present invention, various gas barrier laminated films or laminates in which an additional component layer is, as required, further laminated on the above-mentioned component layer, can be used according to intended uses. As the additional component layer, a plastic film and/or paper are/is preferably mentioned.

According to a usual embodiment, a gas barrier laminate in which a plastic film is provided on the surface of the resin layer and/or the surface of a support film is used for various applications. The thickness of the above-mentioned plastic film is suitably selected from the range of usually 5 to 500 μm, and preferably 10 to 200 μm according to the intended use from the viewpoints of mechanical strength, flexibility, transparency, etc., as a support for a laminated film or a laminate. The width and the length are not limited, and can be suitably determined according to the intended use. For example, heat sealing can be realized by applying a heat-sealable resin to the surface of a resin layer or a support film, and the present invention can be used as various containers. Examples of the heat-sealable resin include known resins such as a polyethylene resin, a polypropylene resin, an ethylene-vinylacetate copolymer, an ionomer resin, an acrylic resin, and a biodegradable resin.

Moreover, in another embodiment of a gas barrier laminated film described above, a laminate in which a printing layer is formed on the surface of a resin layer, and a heat-seal layer and a plastic film are further laminated thereon. As printing ink forming the printing layer, an aqueous and solvent-based resin containing printing ink can be used. Here, mentioned as resin used for printing ink are acrylic resins, urethane-based resins, polyester-based resins, vinyl chloride-based resins, vinyl acetate copolymer resins, and polyvinyl acetal resins, or their mixtures. Further, to the printing ink, known additives such as antistatic agents, light blocking agents, UV-absorbers, plasticizers, lubricants, fillers, colorants, stabilizers, lubricants, defoaming agents, cross-linking agents, anti-blocking agents, and antioxidants may be added.

There is no limitation on printing methods for preparing the printing layer, and known printing methods such as offset printing, gravure printing, and screen printing can be used. For drying the solvent after printing, known drying methods such as hot blow drying, hot roll drying, and infrared drying can be used.

Between the printing layer and the heat-seal layer or the plastic film, at least one layer of paper or another plastic film can be inserted. As the plastic film, the same substance as the thermoplastic polymer film as a support film which is used for the gas barrier laminated film of the present invention can be used. In particular, from the viewpoint of obtaining sufficient rigidity and strength of a laminate, paper, a polyester resin, a polyamide resin, polyvinyl alcohol, or a biodegradable resin is preferable.

As an example of the structure of the laminate, in the case where a polyester film is used for a support film, a laminate in which a heat-seal layer is laminated on a side of a resin layer of a laminated film is mentioned, and an embodiment in which a printing layer, a polyamide film, etc., are formed therebetween is also mentioned. In that case, when the hot water shrinkage at 127° C. of a polyamide film is 15% or less, the stress due to dimensional change in a laminate at the time of the hot water treatment is kept low, and gas barrier performance after the hot water treatment becomes excellent.

When a polyamide film or a polyvinyl alcohol film is used for the support film, a laminate in which the printing layer and/or the polyester film are/is laminated on the side of a resin layer of a laminated film and the heat-seal layer is laminated on the side of the support film is, for example, mentioned.

Mentioned as a specific embodiment of the above-mentioned laminate is (A-1) a laminate in which a biaxially stretched polyester film is used for the support film (A) and a 30 to 200 μm thick unstretched polypropylene film is laminated on the surface of the resin layer of a laminated film; (A-2) a laminate in which a biaxially stretched polyester film is used for the support film (A) a 5 to 100 μm thick biaxially stretched nylon 6 film and a 30 to 200 μm thick unstretched polypropylene film are sequentially laminated on the surface of the resin layer of a laminated film; or (B) a laminate in which a biaxially stretched polyester film is used for the support film, a 5 to 100 μm thick biaxially stretched polyester film is laminated on the surface of the resin layer of a laminated film, and a 30 to 200 μm thick unstretched polypropylene film is laminated on the surface of the support film of a laminated film. The oxygen permeability of each laminate after hot water treatment at 95 or 120° C. for 30 minutes is preferably 30 cc/m$^2$/24 hr/MPa or lower, more preferably 20 cc/m$^2$/24 hr/MPa or lower, and still more preferably 10 cc/m$^2$/24 hr/MPa or lower.

In the present invention, from the viewpoints of gas barrier performance, stabilization of the film quality and the quality of the coating layer, etc., it is preferable to perform heat treatment after forming an inorganic thin film, after forming a resin layer, or after laminating a printing layer, a plastic film and/or paper on the resin layer or the support film. The heat treatment may be performed at suitable two or more stages among the above-mentioned respective stages.

The conditions of the heat treatment vary depending on the type, thickness, etc. of components forming a gas barrier laminated film or a laminate. The heat treatment methods are not limited insofar as a required temperature and time can be maintained. For example, there may be employed: a method of storing a film in an oven or a thermostat chamber whose temperature is set to a required temperature; a method of applying a hot blow to a film; a method of heating a film with an IR heater; a method of irradiating a film with light using a lamp; a method of directly providing heat to a film by bringing the film into contact with a hot roll and/or a hot plate; or a method of irradiating a film with a microwave. A film may be subjected to heat treatment after being cut to a dimension at which the handling thereof is facilitated or a film roll may be subjected to heat treatment as it is. Insofar as a required time and a required temperature can be achieved, heating can be carried out during a production process by installing a heating apparatus in a part of a film production device such as a coater and a slitter.

The heat treatment temperature is not limited insofar as the temperature is equal to or lower than the melting point of a support, a plastic film, and the like, which are to be used. The heat treatment temperature is preferably 60° C. or more, and more preferably 70° C. or more, considering the fact that a heat treatment time required for exhibiting the heat treatment effect can be suitably determined. The upper limit of the heat treatment temperature is usually 200° C., and preferably 160° C. from the viewpoint of preventing deterioration in gas barrier performance due to thermal decomposition of components forming a gas barrier laminated film or a laminate. The treatment time depends on a heat treatment temperature. As the treatment temperature is higher, it is preferable to shorten the heat treatment time. For example: when the heat treatment temperature is 60° C., the heat treatment time is about 3 days to 6 months; when the heat treatment temperature is 80° C., the treatment time is about 3 hours to 10 days; when the heat treatment temperature is 120° C., the treatment time is about one hour to 1 day; and when the heat treatment temperature is 150° C., the treatment time is about 3 minutes to 60 minutes. The above-mentioned heat treatment temperatures and heat treatment times are merely examples, and the heat treatment temperatures and the heat treatment times can be suitably adjusted depending on the type, thickness, and the like of the components forming a gas barrier laminated film or a laminate.

Fourth Invention

A method for producing the gas barrier laminated film according to the first invention at least includes: (A) a step of forming an inorganic thin film on at least one side of a support film by a deposition method; and (B) applying an aqueous dispersion obtained by mixing a polyvinyl alcohol (a), an ethylene-unsaturated carboxylic acid copolymer (b), and inorganic particle (c) to the surface of the inorganic thin film.

A method for producing the gas barrier laminated film according to the second invention includes: (A) a step of forming an inorganic thin film on at least one side of a support film by a deposition method; and (B) a step of applying an aqueous dispersion containing at least one member selected from an ethylene-unsaturated carboxylic acid copolymer (b), inorganic particles (c), and a cross-linking agent (d) to the surface of the inorganic thin film.

A method for producing the gas barrier laminated film according to the third invention includes: (A) a step of forming an inorganic thin film on at least one side of a support film by a deposition method; and (B) applying an aqueous dispersion obtained by mixing polyvinyl alcohol (a), an ethylene-unsaturated carboxylic acid copolymer (b), inorganic particles (c), and a cross-linking agent (d) to the surface of the inorganic thin film.

By the step (A) of forming the inorganic thin film on at least one side of the support film by a deposition method or the like, a uniform thin film having high gas barrier performance can be obtain as described above. As the deposition method, any methods used for the above-described methods of forming the inorganic thin film are used.

Moreover, for the step (B) of applying the aqueous (dispersion) solution of the present invention to the surface of the inorganic thin film, each of the above-mentioned components (a) to (d) can be used. The step can be effected by preparing such aqueous dispersions by the above-described methods, and applying the aqueous dispersion to the surface of the inorganic thin film.

EXAMPLES

Hereinafter, the present invention will be described in detail by way of the examples and the comparative examples, but is not limited thereto. In the examples below, film treating methods and film evaluation methods are as follows.

<Boiling Treatment>

A laminate was treated using a 95° C. hot water for 30 minutes in an autoclave. Water adhering to the peripheries of the laminate was wiped off and the laminate was air dried. Then, the resultant laminate was subjected to oxygen permeability measurement and laminate strength measurement.

<Retorting Treatment>

A laminate was treated using a 120° C. hot water for 30 minutes in an autoclave. Water adhering to the peripheries of the laminate was wiped off and the laminate was air dried. Then, the resultant laminate was subjected to oxygen permeability measurement and laminate strength measurement.

<Percent Water Vapor Permeation>

In accordance with the conditions stipulated in JIS Z0222 "Moisture permeability test for moisture-proof package container" and JIS Z0208 "Moisture permeability test for moisture-proof wrapping material (cup method)", percent water vapor permeation was determined through the following procedure.

In each analysis, a four-side-sealed bag was fabricated from two laminated films or laminates (moisture permeation area: 10.0 cm×10.0 cm), and calcium chloride anhydrate (about 20 g) serving as a hydroscopic agent was placed in the bag. The bag was placed in a thermo- and hydro-stat (40° C., RH: 90%), and weighed (precision: 0.1 mg) for 14 days at intervals of 48 hours or longer. A period of 14 days was selected, because weight is considered to increase at a constant rate within this period of time. Percent water vapor permeation was calculated from the following equation. Table 1 shows values of the percent water vapor permeation at the day 3.

Percent water vapor permeation $(g/m^2/24 \text{ hr}) = (m/s)/t$, where parameters are as follows:

m; increase in weight (g) between the last two measurements in the test, s: moisture permeation area $(m^2)$, and t; duration (h)/24 (hr) between the last two measurements in the test.

<Oxygen Permeability>

The laminated film or the laminate was measured for the oxygen permeability $(cc/m^2/24 \text{ hr/MPa})$ under the conditions of a temperature of 25° C. and a humidity of 80% RH with an oxygen permeability tester ("OX-TRN100 type oxygen permeability tester" manufactured by Modern Controls Inc.).

A sample which was subjected to boiling treatment at 95° C. and a sample which was subjected to retorting treatment at 120° C. were measured for the oxygen permeability in the same manner as described above.

<Laminate Strength>

In accordance with JIS Z1707, a laminate is cut into a strip of 15 mm wide. Some strips were subjected to boiling treatment at 95° C. and some strips were subjected to retorting treatment at 120° C. as described above, and then parts of those strips were partially peeled. While adding water to the peeled surface, T-type peeling was performed using a peel tester (trade name: EZ-TEST manufactured by Shimadzu Corporation) at a rate of 100 mm/minute, thereby measuring laminate strength (g/15 mm).

<Easy Tearability>

A 3 mm notch was made in a laminated film or a laminate. The laminated film or the laminate was torn back and forth by holding the ends thereof by hands. Then, whether or not the laminated film or the laminate was readily torn without being stretched was evaluated using "○" and "X".

<Printing Gradient>

In gravure printing, 20% gradient printing was performed on the surface of a resin layer of a laminated film. The resultant film was observed with an optical microscope (×200). A state in which the circularity (major axis/minor axis) was less than 1.5 and there was no dislocation of halftone dots was judged to be excellent, and the case which does not apply to the above state was judged to be poor.

<Average Particle Diameter of Inorganic Particles>

The average particle diameter of inorganic particles was measured using "Zetasizer Nano" manufactured by MALVERN.

The preparation method of each aqueous (dispersion) solution is as follows.

<Preparation of Aqueous Solution (a-1) of Polyvinyl Alcohol (PVA)>

Using polyvinyl alcohol (PVA, "Poval N-300" manufactured by Nippon Synthetic Chemical Industry Co., Ltd., degree of saponification: 98% or more) and ion exchange water, an aqueous solution (a-1) (Solid content: 10%) was prepared.

<Preparation of Aqueous Solution (a-2) of Polyvinyl Alcohol (PVA)>

Polyvinylalcohol (PVA, "Gosenol NM-14" manufactured by Nippon Synthetic Chemical Industry Co., Ltd., degree of saponification: 99 mol % or more; degree of polymerization: 1,400) was put in ion exchange water under stirring. The mixture was dissolved at 95° C. for 60 minutes, thereby obtaining a PVA aqueous solution (a-2) (solid content: 10%).

<Preparation of Aqueous Solution (a-3) of Polyvinyl Alcohol (PVA)>

Polyvinylalcohol (PVA, "Gosenol NL-05" manufactured by Nippon Synthetic Chemical Industry Co., Ltd., degree of saponification: 98.5 mol %, degree of polymerization: 500) was put in ion exchange water under stirring. The mixture was dissolved at 95° C. for 60 minutes, thereby obtaining a PVA aqueous solution (a-3) (solid content: 10%).

<Preparation of Aqueous Solution (b-1) of Ethylene-Unsaturated Carboxylic Acid Copolymer>

An ethylene/acrylic acid copolymer (EAA) (acrylic acid: 20% by weight, MFR: 300 g/10 minutes), ammonia, and ion exchange water were mixed under stirring at 95° C. for 2 hours, thereby preparing an aqueous solution (b-1) (degree of neutralization of 50%, solid content: 20%).

<Preparation of Aqueous Solution (b-2) of Ethylene-Unsaturated Carboxylic Acid Copolymer>

An ethylene/methacrylic acid copolymer (EMAA) (methacrylic acid: 20% by weight, MFR: 300 g/10 minutes), sodium hydroxide], and ion exchange water were mixed under stirring at 95° C. for 2 hours, thereby preparing an aqueous solution (b-2) (degree of neutralization of 60%, solid content: 20%).

MFR of the ethylene-unsaturated carboxylic acid copolymer was measured at 190° C. under 2.16 kg load in accordance with JIS K 7210 (testing method for melt mass-flow rate and volume-flow rate of plastic or thermoplastic plastic).

<Preparation of Aqueous Solution (c-1) of Inorganic Particles>

An aqueous solution (c-1) of inorganic particles was prepared according to the description in International Publication Pamphlet No. WO 95/17349, from line 16 on page 2 to line 26 on page 10. To be specific, hydrolysis condensation reaction was performed using tetramethoxysilane (TMOS), methanol, and dilute hydrochloric acid. Subsequently, methanol was distilled off, thereby obtaining a partial hydrolysis condensate and an oligomer having a degree of polymerization of less than 10. Thereafter, the monomer in the oligomer was removed by an inert gas blowing method. Thereafter, a mixed-solution of ethanol and ion exchange water, which is equivalent to a hydrolysis rate of 113%, and maleic acid as a catalyst were added to the oligomer. The mixture was stirred at room temperature for 1 hour, and then water was further added. The resultant was held for two weeks, thereby obtaining an aqueous solution (c-1) of silica particles containing a silanol group among reactive functional groups in a proportion of 40 mol & and having an average particle diameter of 1 nm.

<Preparation of Aqueous Solution (c-2) of Inorganic Particles>

An aqueous solution (c-2) of silica particles was prepared in accordance the paragraphs [0012] to [0031] of the description of JP 06-16414 A. To be specific, sodium water glass JIS No. 3 was dissolved in an aqueous sodium nitrate solution, thereby producing an aqueous sodium silicate solution. The aqueous sodium silicate solution was passed through a hydrogen-type cation exchange resin column, a hydroxyl group-type anion exchange resin column, and again, the hydrogen-type cation exchange resin column in the stated order. Thereafter, an aqueous sodium hydroxide solution was added, thereby obtaining an aqueous silicic acid solution. Subsequently, the aqueous silicic acid solution in an amount equivalent to 20% was subjected to vacuum distillation for removing evaporated water, and simultaneously, the remaining aqueous silicic acid solution was continuously and gradually supplied for successively performing the vacuum distillation, thereby producing a colloidal silica sol. The colloidal silica sol was passed through a hydrogen-type cation exchange resin column, a hydroxyl group-type anion exchange resin column, and again, the hydrogen-type cation exchange resin column in the stated order. Immediately thereafter, a special grade aqueous ammonia was added, thereby obtaining an aqueous silica sol (c-2) in which the pH was 9, the average particle diameter was 4 nm, and the concentration of each of various metal oxides was lower than 500 ppm (reactive functional group: silanol group; proportion: 100 mol %).

<Preparation of Aqueous Solution (c-3) of Inorganic Particles>

An aqueous silica sol (c-3) was obtained following the procedure of the aqueous solution (c-2) of inorganic particles except that 5 mass % of an aqueous silicic acid solution was subjected to vacuum distillation, and vacuum distillation was performed while continuously supplying the remaining aqueous silicic acid solution, thereby adjusting the diameter of silica particles. In the aqueous silica sol (c-3), the pH was 9, the average particle diameter was 20 nm, and the concentration of each of various metal oxides was lower than 500 ppm (reactive functional group: silanol group; proportion: 100 mol %).

<Preparation of Hydrolyzed Solution (c-4) of Alkoxy Silica>

Dilute hydrochloric acid was added to tetraethoxysilane, the mixture was stirred for 30 minutes, thereby obtaining a hydrolyzed solution. The particles were not measured.

<Preparation of Aqueous Solution (d-1) of Carbodiimide Group-Containing Cross-Linking Agent>

To a flask equipped with a stirrer, a reflux condenser, a nitrogen introducing pipe, a thermometer, and a dropping funnel, 130 parts by mass of hexamethylene diisocyanate and 170 parts by mass of polyethylene glycol monomethyl ether (average molecular weight: 400) were added. The mixture was stirred at 120° C. for 1 hour. Then, 20 parts by mass of 4,4'-dicyclohexylmethane diisocyanate and 3 parts by mass of 3-methyl-1-phenyl-2-phosphoren-1-oxide as a carbodiimidization catalyst were further added. The mixture was further stirred at 185° C. for 5 hours under nitrogen stream. After the completion of the reaction, the resultant was allowed to cool to 60° C., and a distilled water was added, thereby obtaining an aqueous solution (d-1) of a carbodiimide group-containing cross-linking agent having a solid content of 40 mass %.

<Preparation of Aqueous Solution (d-2) of Oxazoline Group-Containing Cross-Linking Agent>

In a flask equipped with a stirrer, a reflux condenser, a nitrogen introducing pipe, a thermometer, and a dropping funnel, 179 parts by mass of deionized water and 1 part by mass of 2,2'-azobis(2-amidinopropane)dihydrochloride as a polymerization initiator were charged. The mixture was heated to 60° C. while gradually flowing nitrogen gas. To the resultant, a previously-prepared monomer mixture containing 2 parts by mass of ethyl acrylate, 2 parts by mass of methyl methacrylate, and 16 parts by mass of 2-isopropenyl-2-oxazoline was added dropwise from the dropping funnel in 1 hour. Thereafter, a reaction was carried out at 60° C. for 10 hours under nitrogen stream. After the completion of the reaction, the resultant was cooled, thereby obtaining an aqueous solution (d-2) of 2-oxazoline group-containing resin having a solid content of 10 mass %.

<Epoxy Group-Containing Cross-Linking Agent (d-3)>

Glycerol polyglycidyl ether was used as an epoxy group-containing cross-linking agent (d-3).

<Isocyanate Group-Containing Cross-Linking Agent (d-4)>

As an isocyanate group-containing cross-linking agent (d-4), Aquanate 100 manufactured by Nippon Polyurethane Industry Co., Ltd. was used.

An anchor coat solution was prepared as follows.

<Anchor Coat Solution (A-1)>

An isocyanate compound ("Coronate L" manufactured by Nippon Polyurethane Industry Co., Ltd.) and saturated polyester ("Byron 300" manufactured by Toyobo Co., Ltd.) were mixed in a weight ratio of 1:1 for use.

<Anchor Coat Solution (A-2)>

20% by weight of aqueous acrylic resin solution mentioned below, 20% by weight of an aqueous urethane resin solution mentioned below, and 60% by weight of oxazoline group-containing polymer (Epocros WS-500 manufactured by NIPPON SHOKUBAI CO., LTD.) were mixed for use.

Aqueous acrylic resin solution: A mixture of 40 parts by weight of ethyl acrylate, 30 parts by weight of methyl methacrylate, 20 parts by weight of methacrylic acid, and 10 parts by weight of glycidyl methacrylate were subjected to solution polymerization in ethyl alcohol. After the polymerization, the resultant was heated while adding water for removing ethyl alcohol. The pH was adjusted to 7.5 by ammonia water, thereby obtaining an aqueous acrylic resin solution.

Aqueous urethane resin solution: First, polyester polyol containing 664 parts of terephthalic acid, 631 parts of isophthalic acid, 472 parts of 1,4-butanediol, and 447 parts of neopentyl glycols was obtained. Subsequently, 321 parts of adipic acid and 268 parts of dimethylolpropionic acid were added to the obtained polyester polyol, thereby obtaining pendant carboxyl group-containing polyester polyol A. Further, 160 parts of hexamethylene diisocyanate were added to 1,880 parts of the polyester polyol A, thereby obtaining an aqueous urethane resin solution.

Examples 1 to 5 and Comparative Examples 1 to 5

A polyethylene terephthalate resin (hereinafter abbreviated as PET) ("Novapex" manufactured by Mitsubishi Chemical Corporation) was melt-extruded to thereby form a sheet. By stretching the sheet in a longitudinal direction at a stretching temperature of 95° C. at a stretching ratio of 3.3, and then stretching the sheet in a transverse direction at a stretching temperature of 110° C. at a stretching ratio of 3.3, a 12 μm thick biaxially stretched PET film was obtained. The anchor coat solution (A-1) was applied onto the surface of one side of the film, followed by drying, thereby forming a 0.1 μm thick anchor coat layer.

Subsequently, SiO was evaporated by high frequency heating under vacuum of $1 \times 10^{-5}$ Torr using a vacuum evaporator, thereby forming an about 20 nm thick inorganic thin film on the anchor coat layer. The respective aqueous solutions as prepared above were mixed in proportions shown in Tables 1 and 2, thereby preparing various coating solutions.

The coating solutions were applied onto the surface of the inorganic thin film of the obtained inorganic thin film using a bar coater in such a manner that the dry thickness was 0.1 μm. The resultant was air dried at 80° C. for 2 minutes, thereby obtaining a gas barrier film. The transparency of the film was equivalent to the inorganic thin film, onto which no coating solution was applied.

On the coated surface of the gas barrier film, urethane adhesive was further applied ("AD900" and "CAT-RT85" manufactured by Toyo-Morton, Ltd. were mixed in a ratio of 10:1.5), followed by drying, thereby forming an about 3 μm thick adhesive resin layer. On the adhesive resin layer, a 60 μm thick unstretched polypropylene film ("Pyrene Film CTP1146" manufactured by Toyobo Co., Ltd.) was laminated, and aging was performed at 40° C. for 3 days, thereby obtaining a laminate. The obtained laminate was subjected to the above-described evaluations. The results are shown in Tables 1 and 2.

Example 6

A laminated film and a laminate were obtained following the procedure of Example 1 (formation of an inorganic thin film) except, in place of vapor-depositing silicon oxide (silica), evaporating aluminum, supplying oxygen gas using a gas flow rate controller, and performing vapor-deposition at $1 \times 10^{-4}$ Torr, thereby forming an about 20 nm thick aluminum oxide (alumina) thin film. The obtained laminate was subjected to the above-described evaluations. The results are shown in Table 1.

Examples 7 and 8

Nylon 6 ("Novamid 1020CA" manufactured by Mitsubishi Chemical Corporation) was extruded from an extruder at 280° C., quenched in a cooling drum, and then fixed, thereby obtaining a sheet. The sheet was stretched 3 times at 50° C. in a longitudinal direction and was stretched 3 times at 80° C. in a transverse direction. The resultant sheet was fixed by heating at 215° C., thereby obtaining a 15 μm thick biaxially stretched nylon film (hereinafter referred to as ONY). Thereafter, the anchor coat layer and the inorganic thin film were produced in the same manner as in Example 1. The respective aqueous solutions prepared in proportions shown in Table 1 were applied thereonto, thereby similarly obtaining a gas barrier film. Then, an adhesive resin layer was formed on the surface of the resin layer of the gas barrier film in the same manner as in Example 1. To the adhesive resin layer, a 12 μm thick biaxially stretched polyester film ("H100C" manufactured by Mitsubishi Chemical Polyester Film Corporation) was laminated. The same adhesive resin layer as the above was further formed on the surface of the nylon film, and a 60 μm thick unstretched polypropylene film ("Pyrene Film CTP1146" manufactured by Toyobo Co., Ltd.) was laminated. The resultant was subjected to aging at 40° C. for 3 days, thereby obtaining a laminate. The obtained laminate was subjected to the above-described evaluations. The results are shown in Table 1.

Examples 9 and 10

A polyvinyl alcohol resin having an average degree of polymerization of 2,600 and a degree of saponification of 99.5 mol % was dissolved with water, thereby obtaining 48 mass % of water-containing polyvinyl alcohol. The water-containing polyvinyl alcohol was extruded with an extruder, thereby obtaining a sheet. The sheet was stretched 3 times at 90° C. in a longitudinal direction and was stretched 3 times at 110° C. in a transverse direction. The resultant sheet was fixed by heating at 200° C., thereby obtaining a 12 μm thick biaxially stretched polyvinyl alcohol film (hereinafter referred to as OPVA). Thereafter, an anchor coat layer and an inorganic thin film were produced in the same manner as in Example 1. The respective aqueous solutions prepared in proportions shown in Table 2 were applied thereonto, thereby similarly obtaining a gas barrier film.

Then, onto a 12 μm thick biaxially stretched polyester film ("H100C" manufactured by Mitsubishi Chemical Polyester Film Corporation), urethane adhesive ("AD900" and "CAT-RT85" manufactured by Toyo-Morton, Ltd. were mixed in a ratio of 10:1.5) was applied, followed by drying at 80° C. for 1 minute, thereby forming an about 3 μm thick adhesive resin layer. To the adhesive resin layer, the side of the resin layer of the above-mentioned gas barrier film was laminated, an adhesive resin layer was further formed on the surface of the polyvinyl alcohol film, and a 50 μm thick ethylene vinyl acetate copolymer film ("SB-7" manufactured by Tamapoly Co., Ltd.) was laminated. The resultant was subjected to aging at 40° C. for 3 days, thereby obtaining a laminate. The obtained laminate was subjected to the above-described evaluations. The results are shown in Table 2.

TABLE 1

|  | Example 1 | Example 2 | Example 3 | Example 4 | Example 5 |
|---|---|---|---|---|---|
| Support film | PET | PET | PET | PET | PET |
| Inorganic thin film | Silica | Silica | Silica | Silica | Silica |
| Aqueous dispersion | (a-1) + (b-1) + (c-1) PVA + EAA + Silica | (a-1) + (b-2) + (c-1) PVA + EMAA + Na$^+$ + Silica | (a-1) + (b-2) + (c-2) PVA + EMAA + Na$^+$ + Silica | (a-1) + (b-2) + (c-3) PVA + EMAA + Na$^+$ + Silica | (a-1) + (b-2) + (c-1) PVA + EMAA + Na$^+$ + Silica |
| Silica particles |  |  |  |  |  |
| Particle diameter (nm) | 1 | 1 | 4 | 20 | 1 |
| Functional group | Silanol group Alkoxy group | Silanol group Alkoxy group | Silanol group | Silanol group | Silanol group Alkoxy group |
| Weight ratio of (a)/(b)/(c) | 80/10/10 | 80/10/10 | 80/10/10 | 80/10/10 | 30/30/40 |
| Percent water vapor permeation (g/m$^2$/24 hr) | 0.1 | 0.1 | 0.1 | 0.1 | 0.2 |
| Oxygen permeability (cc/m$^2$/24 hr/MPa) | 1 | 1 | 1 | 1 | 2 |
| Oxygen permeability after boiling at 95° C. (cc/m$^2$/24 hr/MPa) | 8 | 6 | 10 | 19 | 20 |
| Laminate strength after boiling at 95° C. (g/15 mm width) | 530 | 620 | 500 | 480 | 560 |
| Easy tearability | ○ | ○ | ○ | ○ | ○ |

|  | Example 6 | Example 7 | Example 8 |
|---|---|---|---|
| Support film | PET | ONY | ONY |
| Inorganic thin film | Alumina | Silica | Silica |
| Aqueous dispersion | (a-1) + (b-2) + (c-1) PVA + EMAA + Na$^+$ + Silica | (a-1) + (b-2) + (c-1) PVA + EMAA + Na$^+$ + Silica | (a-1) + (b-2) + c-1) PVA + EMAA + Na$^+$ + Silica |
| Silica particles |  |  |  |
| Particle diameter (nm) | 1 | 4 | 1 |
| Functional group | Silanol group Alkoxy group | Silanol group | Silanol group Alkoxy grouup |

TABLE 1-continued

|  |  |  |  |  |
|---|---|---|---|---|
| Weight ratio of (a)/(b)/(c) | | 80/10/10 | 80/10/10 | 30/30/40 |
| Percent water vapor permeation (g/m²/24 hr) | | 0.1 | 0.3 | 0.4 |
| Oxygen permeability (cc/m²/24 hr/MPa) | | 1 | 3 | 4 |
| Oxygen permeability after boiling at 95° C. (cc/m²/24 hr/MPa) | | 7 | 10 | 11 |
| Laminate strength after boiling at 95° C. (g/15 mm width) | | 600 | 500 | 550 |
| Easy tearability | | ○ | ○ | ○ |

TABLE 2

|  | Example 9 | Example 10 | Comparative Example 1 | Comparative Example 2 |
|---|---|---|---|---|
| Support film | OPVA | OPVA | PET | PET |
| Inorganic thin film | Silica | Silica | Silica | Silica |
| Aqueous dispersion | (a-1) + (b-2) + (c-2) PVA + EMAA + Na⁺ + Silica | (a-1) + (b-2) + (c-1) PVA + EMAA + Na⁺ + Silica | None None | (a-1) + (b-1) PVA + EAA |
| Silica particles | | | | |
| Particle diameter (nm) | 4 | 1 | None | None |
| Functional group | Silanol group | Silanol group Alkoxy group | | |
| Weight ratio of (a)/(b)/(c) | 80/10/10 | 30/30/40 | None | 80/20/0 |
| Percent water vapor permeation (g/m²/24 hr) | 0.1 | 0.1 | 0.4 | 0.1 |
| Oxygen permeability (cc/m²/24 hr/MPa) | 1 | 1 | 5 | 1 |
| Oxygen permeability after boiling at 95° C. (cc/m²/24 hr/MPa) | — | — | 40 | 45 |
| Laminate strength after boiling at 95° C. (g/15 mm width) | — | — | 400 | 50 |
| Easy tearability | ○ | ○ | X | X |

|  | Comparative Example 3 | Comparative Example 4 | Comparative Example 5 |
|---|---|---|---|
| Support film | PET | PET | PET |
| Inorganic thin film | Silica | Silica | Silica |
| Aqueous dispersion | (a-1) + (b-2) PVA + EMAA + Na⁺ | (a-1) + (b-2) PVA + EMAA + Na⁺ | (a-1) + (b-2) + (c-4) PVA + EMAA + Na⁺ + Silica |
| Silica particles | | | |
| Particle diameter (nm) | None | None | No particles detected |
| Functional group | | | Silanol group Alkoxy group |
| Weight ratio of (a)/(b)/(c) | 80/20/0 | 30/70/0 | 30/30/40 |
| Percent water vapor permeation (g/m²/24 hr) | 0.1 | 0.2 | 5.0 |
| Oxygen permeability (cc/m²/24 hr/MPa) | 1 | 2 | 60 |
| Oxygen permeability after boiling at 95° C. (cc/m²/24 hr/MPa) | 38 | 35 | 100 or more |

TABLE 2-continued

| | | | |
|---|---|---|---|
| Laminate strength after boiling at 95° C. (g/15 mm width) | 10 | 120 | 90 |
| Easy tearability | Δ | Δ | X |

Examples 11 to 15 and 17 to 20 and Comparative Examples 6 to 11

A polyethylene terephthalate resin (hereinafter abbreviated as PET) ("Novapex" manufactured by Mitsubishi Chemical Corporation) was melt-extruded to thereby form a sheet. By stretching the sheet in the longitudinal direction at a stretching temperature of 95° C. at a stretching ratio of 3.3, and then stretching the sheet in the transverse direction at a stretching temperature of 110° C. at a stretching ratio of 3.3, a 12 μm thick biaxially stretched PET film was obtained. The anchor coat solution (A-1) was applied onto the surface of one side of the film, followed by drying, thereby forming a 0.1 μm thick anchor coat layer.

Subsequently, SiO was evaporated by high frequency heating under vacuum of $1.33 \times 10^{-3}$ Pa using a vacuum evaporator, thereby forming an about 20 nm thick inorganic thin film on the anchor coat layer.

In contrast, the respective aqueous solutions prepared above were mixed using, as solvents, ion exchange water and isopropyl alcohol in an amount equivalent to 10 mass % of a coating solution, in proportions of solid contents shown in Tables 3 to 5, 7 and 8, thereby preparing various coating solutions.

The coating solution was applied onto the surface of the inorganic thin film of the obtained inorganic thin film by gravure roll coating at a wet thickness of 2.9 g/m² and a film travel speed of 200 m/minute, thereby obtaining a gas barrier film having a 0.4 μm thick coating layer (resin layer). The transparency of the film was equivalent to that of the inorganic thin film, onto which no coating solution was applied.

Thereafter, printing ("New LP super white" and "SL302" manufactured by TOYO INK MFG. CO., LTD. were mixed in a mass ratio of 75:25) was performed on the surface of the resin layer of the gas barrier film using a gravure roll printer. Onto the printed side of the gas barrier film, urethane adhesive ("AD900" and "CAT-RT85" manufactured by Toyo-Morton, Ltd. were mixed in a ratio of 10:1.5) was applied, followed by drying, thereby forming an about 3 μm thick adhesive resin layer. On the adhesive resin layer, a 60 μm thick unstretched polypropylene film ("Pyrene Film CTP1146" manufactured by Toyobo Co., Ltd.) was laminated, and aging was performed at 40° C. for 3 days, thereby obtaining a laminate. The obtained laminate was subjected to the above-described evaluations. The results are shown in Tables 3 to 5, and 7 and 8.

In Comparative Example 7, a laminated film and a laminate were obtained in the same manner as in Example 11 except forming no coating layer on the surface of an inorganic thin film. In Comparative Examples 10 to 12, in gravure coating of a coating solution to the surface of an inorganic thin film, when the film travel speed was not reduced to 50 m/minute, a 0.4 μm thick coating layer was not formed.

Example 16

A laminated film and a laminate were obtained following the procedure of Example 11 (Formation of an inorganic thin film) except, in place of vapor-depositing silicon oxide (silica), evaporating aluminum, supplying oxygen gas using a gas flow rate controller, and performing vapor-deposition at $1.33 \times 10^{-2}$ Pa to form an about 20 nm thick aluminum oxide (alumina) thin film, and changing the mass ratio of (b)/(c) to 90/10. The obtained laminate was subjected to the above-described evaluations. The results are shown in Table 4.

Example 21

A laminated film and a laminate were obtained following the procedure of Example 20 (Formation of an inorganic thin film) except, in place of vapor-depositing silicon oxide (silica), evaporating aluminum, supplying oxygen gas using a gas flow rate controller, and performing vapor-deposition at $1.33 \times 10^{-2}$ Pa, thereby forming an about 20 nm thick aluminum oxide (alumina) thin film. The obtained laminate was subjected to the above-described evaluations. The results are shown in Table 5.

Examples 22 to 24

Nylon 6 ("Novamid 1020CA" manufactured by Mitsubishi Chemical Corporation) was extruded from an extruder at 280° C., quenched in a cooling drum, and fixed, thereby obtaining a sheet. The sheet was stretched 3 times at 50° C. in the longitudinal direction and was stretched 3 times at 80° C. in the transverse direction. The resultant sheet was fixed by heating at 215° C., thereby obtaining a 15 μm thick biaxially stretched nylon film (hereinafter referred to as ONY). Thereafter, an anchor coat layer and an inorganic thin film were produced in the same manner as in Example 11. Then, the respective aqueous solutions prepared in proportions shown in Table 5 were applied thereonto, thereby similarly obtaining a gas barrier film.

Then, printing was performed in the same manner as in Example 11, and an adhesive resin layer was formed on the printed side of the gas barrier film in the same manner as in Example 11. On the adhesive resin layer, a 12 μm thick biaxially stretched polyester film ("H100C" manufactured by Mitsubishi Chemical Polyester Film Corporation) was laminated. The same adhesive resin layer as the above was further formed on the surface of the nylon film, and a 60 μm thick unstretched polypropylene film ("Pyrene Film CTP1146" manufactured by Toyobo Co., Ltd.) was laminated. The resultant was subjected to aging at 40° C. for 3 days, thereby obtaining a laminate. The obtained laminate was subjected to the above-described evaluations. The results are shown in Table 5.

Examples 25 to 27

A polyvinyl alcohol resin having an average degree of polymerization of 2,600 and a degree of saponification of 99.5 mol % was dissolved with water, thereby obtaining 48 mass % of water-containing polyvinyl alcohol. The water-containing polyvinyl alcohol was extruded with an extruder, thereby obtaining a sheet. The sheet was stretched 3 times at 90° C. in the longitudinal direction and was stretched 3 times at 110° C. in the transverse direction. The resultant sheet was fixed by heating at 200° C., thereby obtaining a 12 μm thick biaxially stretched polyvinyl alcohol film (hereinafter referred to as OPVA). Thereafter, the anchor coat layer and the inorganic thin film were produced in the same manner as in Example 1. The respective aqueous solutions prepared in proportions shown in Table 6 were applied thereonto, thereby similarly obtaining a gas barrier film.

Then, printing was performed in the same manner as in Example 11, and onto a 12 μm thick biaxially stretched polyester film ("H100C" manufactured by Mitsubishi Chemical Polyester Film Corporation), urethane adhesive ("AD900" and "CAT-RT85" manufactured by Toyo-Morton, Ltd. were mixed in a ratio of 10:1.5) was applied, followed by drying at 80° C. for 1 minute, thereby forming an about 3 μm thick adhesive resin layer. To the adhesive resin layer, the side of the resin layer of the above-mentioned gas barrier film was laminated, an adhesive resin layer was further formed on the surface of the polyvinyl alcohol film, and a 50 μm thick ethylene vinyl acetate copolymer film ("SB-7" manufactured by Tamapoly Co., Ltd.) was laminated. The resultant was subjected to aging at 40° C. for 3 days, thereby obtaining a laminate. The obtained laminate was subjected to the above-described evaluations. The results are shown in Table 6.

TABLE 3

| | | | Examples | | | |
|---|---|---|---|---|---|---|
| | | | 11 | 12 | 13 | 14 |
| Support film | | | PET | PET | PET | PET |
| Type of inorganic thin film | | | Silica | Silica | Silica | Silica |
| Aqueous dispersion | (b) Component | Type | (b-2) EMAA + Na$^+$ | (b-2) EMAA + Na$^+$ | (b-2) EMAA + Na$^+$ | (b-2) EMAA + Na$^+$ |
| | (c) Component | Type | (c-1) | (c-2) | (c-3) | (c-1) |
| | [Silica] | Average particle diameter (nm) | 1 | 4 | 20 | 1 |
| | | Functional group | Silanol group Alkoxy group | Silanol group | Silanol group | Silanol group Alkoxy group |
| | (d) Component | Type | — — | — — | — — | — — |
| | Mass ratio of each component | | (b)/(c) 70/30 | (b)/(c) 60/40 | (b)/(c) 80/20 | (b)/(c) 30/70 |
| Evaluation results | Gravure coating [200 m/minute] | | Possible | Possible | Possible | Possible |
| | Printing gradient | | Excellent | Excellent | Excellent | Excellent |
| | Percent water vapor permeation (g/m$^2$/24 hr) | | 0.2 | 0.2 | 0.2 | 0.2 |
| | Oxygen permeability (cc/m$^2$/24 hr/MPa) | | 6 | 6 | 6 | 5 |
| | Oxygen permeability after boiling at 95° C. (cc/m$^2$/24 hr/MPa) | | 7 | 8 | 8 | 15 |
| | Laminate strength after boiling at 95° C. (g/15 mm width) | | 700 | 700 | 700 | 600 |
| | Easy tearability | | ○ | ○ | ○ | ○ |

TABLE 4

| | | | Examples | | | |
|---|---|---|---|---|---|---|
| | | | 15 | 16 | 17 | 18 |
| Support film | | | PET | PET | PET | PET |
| Type of inorganic thin film | | | Silica | Alumina | Silica | Silica |
| Aqueous dispersion | (b) Component | Type | (b-1) EAA | (b-2) EMAA + Na$^+$ | (b-2) EMAA + Na$^+$ | (b-2) EMAA + Na$^+$ |
| | (c) Component | Type | (c-2) | (c-1) | (c-2) | (c-2) |
| | [Silica] | Average particle diameter (nm) | 4 | 1 | 4 | 4 |
| | | Functional group | Silanol group | Silanol group Alkoxy group | Silanol group | Silanol group |
| | (d) Component | Type | — — | — — | (d-2) Oxazoline-base | (d-1) Carbodiimide-base |
| | Mass ratio of each component | | (b)/(c) 60/40 | (b)/(c) 90/10 | (b)/(c)/(d) 50/45/5 | (b)/(c)/(d) 50/10/40 |
| Evaluation results | Gravure coating [200 m/minute] | | Possible | Possible | Possible | Possible |
| | Printing gradient | | Excellent | Excellent | Excellent | Excellent |
| | Percent water vapor permeation (g/m$^2$/24 hr) | | 0.4 | 0.2 | 0.2 | 0.2 |
| | Oxygen permeability (cc/m$^2$/24 hr/MPa) | | 5 | 3 | 5 | 3 |
| | Oxygen permeability after boiling at 95° C. (cc/m$^2$/24 hr/MPa) | | 25 | 7 | 7 | 7 |
| | Laminate strength after boiling at 95° C. (g/15 mm width) | | 600 | 700 | 700 | 700 |
| | Easy tearability | | ○ | ○ | ○ | ○ |

TABLE 5

| | | | Examples | | | | | |
|---|---|---|---|---|---|---|---|---|
| | | | 19 | 20 | 21 | 22 | 23 | 24 |
| Support film | | | PET | PET | PET | ONY | ONY | ONY |
| Type of inorganic thin film | | | Silica | Silica | Alumina | Silica | Silica | Silica |
| Aqueous dispersion | (b) Component | Type | (b-2) EMAA + Na$^+$ | (b-2) EMAA + Na$^+$ | (b-2) EMAA + Na$^+$ | (b-2) EMAA + Na$^+$ | (b-2) EMAA + Na$^+$ | (b-2) EMAA + Na$^+$ |
| | (c) Component | Type | — | — | — | (c-2) | (c-2) | — |
| | [Silica] | Average particle diameter (nm) | — | — | — | 4 | 4 | — |
| | | Functional group | — | — | — | Silanol group | Silanol group | — |
| | (d) Component | Type | (d-2) Oxazoline-base | (d-1) Carbodiimide-base | (d-1) Carbodiimide-base | — | (d-1) Carbodiimide-base | (d-1) Carbodiimide-base |
| | Mass ratio of each component | | (b)/(d) 90/10 | (b)/(d) 60/40 | (b)/(d) 60/40 | (b)/(c) 60/40 | (b)/(c)/(d) 50/45/5 | (b)/(d) 90/10 |
| Evaluation results | Gravure coating [200 m/minute] | | Possible | Possible | Possible | Possible | Possible | Possible |
| | Printing gradient | | Excellent | Excellent | Excellent | Excellent | Excellent | Excellent |
| | Percent water vapor permeation (g/m$^2$/24 hr) | | 0.2 | 0.4 | 0.2 | 0.3 | 0.3 | 0.3 |
| | Oxygen permeability (cc/m$^2$/24 hr/MPa) | | 4 | 3 | 3 | 3 | 3 | 3 |
| | Oxygen permeability after boiling at 95° C. (cc/m$^2$/24 hr/MPa) | | 7 | 7 | 7 | 10 | 9 | 10 |
| | Laminate strength after boiling at 95° C. (g/15 mm width) | | 700 | 700 | 700 | 700 | 640 | 620 |
| | Easy tearability | | ◯ | ◯ | ◯ | ◯ | ◯ | Δ |

TABLE 6

| | | | Examples | | |
|---|---|---|---|---|---|
| | | | 25 | 26 | 27 |
| Support film | | | OPVA | OPVA | OPVA |
| Type of inorganic thin film | | | Silica | Silica | Silica |
| Aqueous dispersion | (b) Component | Type | (b-2) EMAA + Na$^+$ | (b-2) EMAA + Na$^+$ | (b-2) EMAA + Na$^+$ |
| | (c) Component | Type | (c-2) | (c-2) | — |
| | [Silica] | Average particle diameter (nm) | 4 | 4 | — |
| | | Functional group | Silanol group | Silanol group | — |
| | (d) Component | Type | — | (d-1) Carbodiimide-base | (d-1) Carbodiimide-base |
| | Mass ratio of each component | | (b)/(c) 60/40 | (b)/(c)/(d) 50/45/5 | (b)/(d) 90/10 |
| Evaluation results | Gravure coating [200 m/minute] | | Possible | Possible | Possible |
| | Printing gradient | | Excellent | Excellent | Excellent |
| | Percent water vapor permeation (g/m$^2$/24 hr) | | 0.2 | 0.2 | 0.2 |
| | Oxygen permeability (cc/m$^2$/24 hr/MPa) | | 2 | 2 | 2 |
| | Easy tearability | | ◯ | ◯ | ◯ |

TABLE 7

| | | | Comparative Examples | | |
|---|---|---|---|---|---|
| | | | 6 | 7 | 8 |
| Support film | | | PET | PET | PET |
| Type of inorganic thin film | | | Silica | Silica | Silica |
| Aqueous dispersion | (b) Component | Type | — | (b-2) EMAA + Na$^+$ | (b-1) EAA |
| | (c) Component | Type | — | — | — |
| | [Silica] | Average particle diameter (nm) | — | — | — |
| | | Functional group | — | — | — |

TABLE 7-continued

|  |  |  | Comparative Examples | | |
|---|---|---|---|---|---|
|  |  |  | 6 | 7 | 8 |
|  | (d) Component | Type | — | — | — |
|  | Mass ratio of each component |  | — | (b) alone | (b) alone |
| Evaluation results | Gravure coating [200 m/minute] |  | Possible | Possible | Possible |
|  | Printing gradient |  | Excellent | Poor | Poor |
|  | Percent water vapor permeation ($g/m^2$/24 hr) |  | 0.5 | 0.5 | 0.5 |
|  | Oxygen permeability ($cc/m^2$/24 hr/MPa) |  | 5 | 6 | 5 |
|  | Oxygen permeability after boiling at 95° C. ($cc/m^2$/24 hr/MPa) |  | 40 | 8 | 39 |
|  | Laminate strength after boiling at 95° C. (g/15 mm width) |  | 400 | 750 | 500 |
|  | Easy tearability |  | X | X | X |

TABLE 8

|  |  |  | Comparative Examples | | |
|---|---|---|---|---|---|
|  |  |  | 9 | 10 | 11 |
| Support film |  |  | PET | PET | PET |
| Type of inorganic thin film |  |  | Silica | Silica | Silica |
| Aqueous dispersion | (b) Component | Type | (a-3) PVA | (b-2) + (a-3) EMAA + $Na^+$ + PVA | (a-3) PVA |
|  | (c) Component | Type | — | — | (c-2) |
|  | [Silica] | Average particle diameter (nm) | — | — | 4 |
|  |  | Functional group | — | — | Silanol group |
|  | (d) Component | Type | — | — | — |
|  | Mass ratio of each component |  | (a-3) alone | (b)/(a-3) 50/50 | (a-3)/(c) 50/50 |
| Evaluation results | Gravure coating [200 m/minute] |  | Impossible | Impossible | Impossible |
|  | Printing gradient |  | Excellent | Excellent | Excellent |
|  | Percent water vapor permeation ($g/m^2$/24 hr) |  | 0.1 | 0.2 | 0.2 |
|  | Oxygen permeability ($cc/m^2$/24 hr/MPa) |  | 2 | 2 | 2 |
|  | Oxygen permeability after boiling at 95° C. ($cc/m^2$/24 hr/MPa) |  | Peeling | 50 | Peeling |
|  | Laminate strength after boiling at 95° C. (g/15 mm width) |  | 0 | 100 | 0 |
|  | Easy tearability |  | X | X | ◯ |

Examples 28 to 42 and Comparative Examples 12 to 15

A polyethylene terephthalate resin ("Novapex" manufactured by Mitsubishi Chemical Corporation) was melt-extruded to thereby form a sheet. By stretching the sheet in the longitudinal direction at a stretching temperature of 95° C. at a stretching ratio of 3.3, and then stretching the sheet in the transverse direction at a stretching temperature of 110° C. at a stretching ratio of 3.3, a 12 μm thick biaxially stretched PET film (hereinafter referred to as OPET) was obtained. The anchor coat solution (A-1) was applied onto the surface of one side of the film, followed by drying, thereby forming a 0.1 μm thick anchor coat layer.

Subsequently, SiO was evaporated by high frequency heating under vacuum of $1 \times 10^{-5}$ Torr using a vacuum evaporator, thereby forming an about 20 nm thick inorganic thin film on the anchor coat layer. In contrast, the respective aqueous solutions (a) to (d) prepared above were mixed in such a manner as to have proportions shown in Table 9, thereby preparing various coating solutions.

The coating solution was applied onto the surface of the inorganic thin film of the obtained inorganic thin deposited film by gravure roll coating at a wet thickness of 2.9 $g/m^2$ and a film travel speed of 200 m/minute. The resultant was dried by hot blow of 90° C. for 5 seconds, thereby obtaining a gas barrier laminated film having a 0.4 μm thick coating layer (resin layer). The transparency of the film was equivalent to that of the inorganic thin film, onto which no resin layer solution was applied. Thereafter, printing (Non-toluene ink "ECOS970 white" and "GUNT solvent" manufactured by The Inctech Inc. were mixed in a mass ratio of 100:30) was performed on the surface of the resin layer of the gas barrier laminated film using a gravure roll printer.

Then, onto the printed side of the gas barrier film, urethane adhesive ("AD900" and "CAT-RT85" manufactured by Toyo-Morton, Ltd. were mixed in a ratio of 10:1.5) was applied, followed by drying at 80° C. for 1 minute, thereby forming an about 3 μm thick adhesive resin layer. On the adhesive resin layer, a 60 μm thick unstretched polypropylene film ("Pyrene Film CTP1146" manufactured by Toyobo Co., Ltd.) was laminated, and aging was performed at 40° C. for 3 days, thereby obtaining a laminate. The obtained laminate was subjected to the above-described evaluations. The results are shown in Table 10.

Example 43

A polyethylene terephthalate resin (melt viscosity: 0.65) was melt-extruded to thereby form a sheet. By stretching the sheet in the longitudinal direction at a stretching temperature of 95° C. at a stretching ratio of 3.5, and then the anchor coat solution <A-2> was applied by in-line coating. Thereafter, the resultant was stretched in the transverse direction at a stretching temperature of 110° C. at a stretching ratio of 3.5, and fixed by heating at 230° C., thereby obtaining a biaxially stretched PET film having a 0.1 μL m thick anchor coat layer. A gas barrier laminated film and a laminate were obtained in the same manner as in Example 28 except that the mixing proportions shown in Table 9 were used. The obtained laminate was subjected to the above-described evaluations. The results are shown in Table 10.

Example 44

A gas barrier laminated film and a laminate were obtained following the procedure of Example 37 except producing a gas barrier laminated film, and then heating the film at 60° C. for 3 days. The obtained laminate was subjected to the above-described evaluations. The results are shown in Table 10.

Example 45

A gas barrier laminated film and a laminate were obtained following the procedure of Example 37 except forming an adhesive resin layer on the printed side of a gas barrier laminated film; laminating the gas barrier laminated film with a 15 μm thick biaxially stretched nylon 6 film ("SN-15" manufactured by Mitsubishi Plastics Inc.); similarly forming an adhesive resin layer on the surface of the biaxially stretched nylon 6 film; laminating a 60 μm thick unstretched polypropylene film ("Pyrene Film CTP1146" manufactured by Toyobo Co., Ltd.); and performing aging at 40° C. for 3 days. The obtained laminate was subjected to the above-described evaluations. The results are shown in Table 10.

Examples 46 and 47

Nylon 6 ("Novamid 1020CA" manufactured by Mitsubishi Chemical Corporation) was extruded from an extruder at 280° C., quenched on a cooling drum, and fixed, thereby obtaining a sheet. The sheet was stretched 3 times at 50° C. in the longitudinal direction and was stretched 3 times at 80° C. in the transverse direction. The resultant sheet was fixed by heating at 215° C., thereby obtaining a 15 μm thick biaxially stretched nylon film (hereinafter referred to as ONY). Thereafter, an anchor coat layer, an inorganic thin film, and an aqueous coating layer (resin layer) were provided, thereby obtaining a gas barrier laminated film in the proportions shown in Table 9 in the same manner as in Example 28. Then, printing was similarly performed thereto.

Then, following the procedure of Example 28: an adhesive resin layer was formed on the printed side of the gas barrier film; a 12 μm thick biaxially stretched polyester film ("H100C" manufactured by Mitsubishi Chemical Polyester Film Corporation) was laminated on the adhesive resin layer; an adhesive resin layer, which was the same as the above, was formed on the surface of the nylon film; a 60 μm thick unstretched polypropylene film ("Pyrene Film CTP1146" manufactured by Toyobo Co., Ltd.) was laminated; and aging was performed at 40° C. for 3 days. The obtained laminate was subjected to the above-described evaluations. The results are shown in Table 10.

Examples 48 and 49

A polyvinyl alcohol resin having an average degree of polymerization of 2,600 and a degree of saponification of 99.5 mol % was dissolved with water, thereby obtaining 48 mass % of water-containing polyvinyl alcohol. The water-containing polyvinyl alcohol was extruded with an extruder, thereby obtaining a sheet. The sheet was stretched 3 times at 90° C. in the longitudinal direction and was stretched 3 times at 110° C. in the transverse direction. The resultant sheet was fixed by heating at 200° C., thereby obtaining a 12 μm thick biaxially stretched polyvinyl alcohol film (hereinafter referred to as OPVA). Thereafter, an anchor coat layer, an inorganic thin film, and an aqueous coating layer (resin layer) were provided, thereby obtaining a gas barrier laminated film in the proportions shown in Table 9 in the same manner as in Example 28. Then, printing was similarly performed thereto.

Then, onto a 12 μm thick biaxially stretched polyester film ("H100C" manufactured by Mitsubishi Chemical Polyester Film Corporation), urethane adhesive ("AD900" and "CAT-RT85" manufactured by Toyo-Morton, Ltd. were mixed in a ratio of 10:1.5) was applied, followed by drying at 80° C. for 1 minute, thereby forming an about 3 μm thick adhesive resin layer. To the adhesive resin layer, the printed side of the resin layer of the above-mentioned gas barrier film was laminated, an adhesive resin layer was further formed on the surface of the polyvinyl alcohol film, a 50 μm thick ethylene vinyl acetate copolymer film ("SB-7" manufactured by Tamapoly Co., Ltd.) was laminated, and aging was performed at 40° C. for 3 days, thereby obtaining a laminate. The obtained laminate was subjected to the above-described evaluations. The results are shown in Table 10.

Example 50

A laminated film and a laminate were obtained following the procedure of Example 28 (Formation of an inorganic thin film) except, in place of vapor-depositing silicon oxide (silica) on the anchor coat layer, evaporating aluminum, supplying oxygen gas using a gas flow rate controller, and performing vapor-deposition at $1 \times 10^{-4}$ Torr, thereby forming an about 20 nm thick aluminum oxide (alumina) thin film as well as using the components (a) to (d) in the proportions shown in Table 9. The obtained laminate was subjected to the above-described evaluations. The results are shown in Table 10.

Example 51

A gas barrier laminated film and a laminate were obtained following the procedure of Example 49 except forming an inorganic thin film without forming an anchor coat layer. The obtained laminate was subjected to the above-described evaluations. The results are shown in Table 10.

TABLE 9

|  | Support film | Anchor coat | Inorganic thin film | (a) Polyvinyl alcohol | (b) Ethylene-unsaturated carboxylic acid copolymer | (c) Inorganic particles | (d) Cross-linking agent | weight ratio of (a)/(b)/(c)/(d) | Heating of laminated film |
|---|---|---|---|---|---|---|---|---|---|
| Example 28 | OPET | A-1 | Silica | a-2 | b-1 | c-2 | d-1 | 5/60/30/5 | None |
| Example 29 | OPET | A-1 | Silica | a-2 | b-1 | c-2 | d-1 | 30/20/45/5 | None |
| Example 30 | OPET | A-1 | Silica | a-2 | b-2 | c-2 | d-1 | 5/70/20/5 | None |
| Example 31 | OPET | A-1 | Silica | a-2 | b-2 | c-2 | d-1 | 30/20/45/5 | None |
| Example 32 | OPET | A-1 | Silica | a-2 | b-2 | c-2 | d-1 | 15/60/20/5 | None |
| Example 33 | OPET | A-1 | Silica | a-2 | b-2 | c-2 | d-1 | 15/20/70/5 | None |
| Example 34 | OPET | A-1 | Silica | a-2 | b-2 | c-2 | d-1 | 10/50/38/2 | None |
| Example 35 | OPET | A-1 | Silica | a-2 | b-2 | c-2 | d-1 | 10/30/30/30 | None |
| Example 36 | OPET | A-1 | Silica | a-3 | b-2 | c-2 | d-1 | 70/10/15/5 | None |
| Example 37 | OPET | A-1 | Silica | a-2 | b-2 | c-2 | d-1 | 20/30/45/5 | None |
| Example 38 | OPET | A-1 | Silica | a-2 | b-2 | c-3 | d-1 | 20/30/45/5 | None |
| Example 39 | OPET | A-1 | Silica | a-2 | b-2 | c-1 | d-1 | 20/30/45/5 | None |
| Example 40 | OPET | A-1 | Silica | a-2 | b-2 | c-2 | d-2 | 20/30/45/5 | None |
| Example 41 | OPET | A-1 | Silica | a-2 | b-2 | c-2 | d-3 | 20/30/45/5 | None |
| Example 42 | OPET | A-1 | Silica | a-2 | b-2 | c-2 | d-4 | 20/30/45/5 | None |
| Example 43 | OPET | A-2 | Silica | a-2 | b-2 | c-2 | d-1 | 20/30/45/5 | Done |
| Example 44 | OPET | A-1 | Silica | a-2 | b-2 | c-2 | d-1 | 20/30/45/5 | None |
| Example 45 | OPET | A-1 | Silica | a-2 | b-2 | c-2 | d-1 | 20/30/45/5 | None |
| Example 46 | ONY | A-1 | Silica | a-2 | b-1 | c-2 | d-1 | 5/60/30/5 | None |
| Example 47 | ONY | A-1 | Silica | a-2 | b-2 | c-2 | d-1 | 30/20/45/5 | None |
| Example 48 | OPVA | A-1 | Silica | a-2 | b-1 | c-2 | d-1 | 5/60/30/5 | None |
| Example 49 | OPVA | A-1 | Silica | a-2 | b-2 | c-2 | d-1 | 30/20/45/5 | None |
| Example 50 | OPET | A-1 | Alumina | a-2 | b-2 | c-2 | d-1 | 20/30/45/5 | None |
| Example 51 | OPET | None | Alumina | a-2 | b-2 | c-2 | d-1 | 20/30/45/5 | None |
| Comparative Example 12 | OPET | A-1 | Silica | — | — | — | — | — | None |
| Comparative Example 13 | OPET | A-1 | Silica | a-2 | b-1 | — | — | 80/20/0/0 | None |
| Comparative Example 14 | OPET | A-1 | Silica | a-2 | b-2 | — | — | 80/20/0/0 | None |
| Comparative Example 15 | OPET | A-1 | Silica | a-2 | b-2 | — | — | 20/80/0/0 | None |

TABLE 10

|  | Gravure coating (20 m/min) * | Printing gradient | Percent water vapor permeation (g/m²/24 hr) | Oxygen permeability (cc/m²/24 hr/MPa) | Oxygen permeability (cc/m²/24 hr/MPa) | | Laminate strength (g/15 mm) | |
|---|---|---|---|---|---|---|---|---|
|  |  |  |  |  | After boiling at 95° C. | After retorting at 120° C. | After boiling at 95° C. | After retorting at 120° C. |
| Example 28 | Possible | Excellent | 0.2 | 2 | 5 | 9 | 550 | 400 |
| Example 29 | Possible | Excellent | 0.2 | 2 | 5 | 9 | 500 | 300 |
| Example 30 | Possible | Excellent | 0.3 | 2 | 4 | 7 | 600 | 400 |
| Example 31 | Possible | Excellent | 0.2 | 2 | 5 | 7 | 450 | 300 |
| Example 32 | Possible | Excellent | 0.2 | 2 | 4 | 7 | 480 | 300 |
| Example 33 | Possible | Excellent | 0.2 | 2 | 3 | 6 | 550 | 400 |
| Example 34 | Possible | Excellent | 0.2 | 2 | 4 | 7 | 620 | 400 |
| Example 35 | Possible | Excellent | 0.2 | 2 | 4 | 8 | 500 | 350 |
| Example 36 | Possible | Excellent | 0.1 | 1 | 7 | 10 | 300 | 200 |
| Example 37 | Possible | Excellent | 0.1 | 2 | 3 | 6 | 600 | 420 |
| Example 38 | Possible | Excellent | 0.2 | 2 | 4 | 7 | 600 | 400 |
| Example 39 | Possible | Excellent | 0.2 | 2 | 3 | 6 | 620 | 420 |
| Example 40 | Possible | Excellent | 0.2 | 2 | 4 | 7 | 600 | 400 |
| Example 41 | Possible | Excellent | 0.2 | 2 | 5 | 9 | 550 | 400 |
| Example 42 | Possible | Excellent | 0.2 | 2 | 6 | 10 | 530 | 380 |
| Example 43 | Possible | Excellent | 0.2 | 2 | 3 | 6 | 620 | 450 |
| Example 44 | Possible | Excellent | 0.1 | 2 | 3 | 3 | 680 | 500 |
| Example 45 | Possible | Excellent | 0.1 | 2 | 4 | 7 | 530 | 330 |
| Example 46 | Possible | Excellent | 0.3 | 3 | 7 | 10 | 600 | 400 |
| Example 47 | Possible | Excellent | 0.3 | 3 | 5 | 9 | 520 | 380 |
| Example 48 | Possible | Excellent | 0.05 | 0.5 | — | — | — | — |
| Example 49 | Possible | Excellent | 0.05 | 0.5 | — | — | — | — |
| Example 50 | Possible | Excellent | 0.2 | 2 | 4 | 6 | 620 | 420 |
| Example 51 | Possible | Excellent | 0.2 | 2 | 5 | 10 | 320 | 200 |
| Comparative Example 12 | — | Excellent | 3.0 | 50 | 100 | 250 | 580 | 400 |
| Comparative Example 13 | Impossible | Excellent | 0.4 | 4 | 52 | Peeling | 50 | Peeling |

TABLE 10-continued

| | Gravure coating (20 m/min) * | Printing gradient | Percent water vapor permeation (g/m²/24 hr) | Oxygen permeability (cc/m²/24 hr/MPa) | Oxygen permeability (cc/m²/24 hr/MPa) After boiling at 95° C. | Oxygen permeability (cc/m²/24 hr/MPa) After retorting at 120° C. | Laminate strength (g/15 mm) After boiling at 95° C. | Laminate strength (g/15 mm) After retorting at 120° C. |
|---|---|---|---|---|---|---|---|---|
| Comparative Example 14 | Impossible | Excellent | 0.4 | 4 | 50 | Peeling | 10 | Peeling |
| Comparative Example 15 | Impossible | Poor | 0.6 | 6 | 48 | 50 | 120 | 50 |

* When it was impossible to perform gravure coating (200 m/min), coating was performed at 50 m/min, thereby producing a sample.

In Tables 3 to 8 and 10, the percent water vapor permeation and the oxygen permeability indicate numerical values of laminates, to which printing was performed and which were laminated. The percent water vapor permeation and the oxygen permeability of each laminate which was obtained by laminating without performing printing were equal to or lower than the values of the laminate to which printing was performed.

INDUSTRIAL APPLICABILITY

The gas barrier laminated film of the present invention is widely used for wrapping articles which require blocking of various gases such as water vapor and oxygen, for example, for wrapping articles so as to prevent deterioration of foodstuffs, industrial goods, and medical products. Moreover, besides the wrapping applications, the gas barrier laminated film of the present invention can be suitably used as transparent electroconductive sheets and vacuum heat-insulation materials which are used for liquid crystal display devices, solar batteries, electromagnetic wave shields, touch panels, EL substrates, color filters, etc.

The invention claimed is:

1. A gas barrier laminated film comprising a thermoplastic polymer film, an inorganic thin film formed on at least one side of the thermoplastic polymer film, and a resin layer which is obtained by applying an aqueous dispersion containing an ethylene-unsaturated carboxylic acid copolymer (b) and inorganic particles (c), to a surface of the inorganic thin film, wherein an average particle diameter of the inorganic particles (c) is 0.5 to 25 nm and the inorganic particles (c) are silica particles having at least one silanol group,
wherein when 20% gradient printing is performed on the surface of a resin layer of a laminated film in gravure printing at a wet thickness of 2.9 g/m² and a film travel speed of 200 m/min, the circularity is less than 1.5, there is no dislocation of halftone dots, percent water vapor permeation is 0.05 to 0.4 g/m²/24 hr and oxygen permeability is 0.5 to 6 cc/m²/24 hr/MPa.

2. The gas barrier laminated film according to claim 1, wherein the aqueous dispersion further comprises (a) polyvinyl alcohol.

3. The gas barrier laminated film according to claim 2 or 1, wherein the aqueous dispersion further comprises at least one a cross-linking agent (d).

4. The gas barrier laminated film according to claim 2, wherein a degree of saponification of the polyvinyl alcohol (a) is 90% or more.

5. The gas barrier laminated film according to claim 1, wherein the ethylene-unsaturated carboxylic acid copolymer (b) contains a neutralized substance of ethylene-unsaturated carboxylic acid copolymer.

6. The gas barrier laminated film according to claim 5, wherein the neutralized substance of ethylene-unsaturated carboxylic acid copolymer includes alkaline metal salt of ethylene-unsaturated carboxylic acid copolymer.

7. The gas barrier laminated film according to claim 3, wherein the cross-linking agent (d) contains at least one member selected from an oxazoline group, a carbodiimide group, an epoxy group, and an isocyanate group.

8. The gas barrier laminated film according to claim 2, wherein, in the resin layer, at least one of the following contents is satisfied:
a content of the polyvinyl alcohol (a) being 10 to 95 mass % with respect to a total amount based on solid content of the component (a), the component (b), and the component (c);
a content of the ethylene-unsaturated carboxylic acid copolymer (b) being 3 to 80 mass % with respect to a total amount based on solid content of the component (a), the component (b), and the component (c); and
a content of the inorganic particles (c) being 2 to 80 mass % with respect to a total amount based on solid content of the component (b), the component (c), and the component (a).

9. The gas barrier laminated film according to claim 3, wherein, in the resin layer, at least one of the following contents is satisfied: a content of the inorganic particles (c) being 5 to 75 mass % with respect to a total amount based on solid content of the component (b), the component (c), and the component (d); and a content of the cross-linking agent (d) being 3 to 50 mass % with respect to a total amount based on solid content of the component (b), the component (c), and the component (d).

10. The gas barrier laminated film according to claim 3, wherein, in the resin layer, at least one of the following contents is satisfied:
a content of polyvinyl alcohol (a) being 5 to 70 mass % with respect to a total amount based on solid content of the component (a), the component (b), the component (c), and the component (d);
a content of etylene-unsaturated carboxylic acid copolymer (b) being 10 to 70 mass % with respect to a total amount based on solid content of the component (a), the component (b), the component (c), and the component (d);
a content of the inorganic particles (c) being 20 to 70 mass % with respect to a total amount based on solid content of the component (a), the component (b), the component (c), and the component (d); and
a content of the cross-linking agent (d) being 2 to 30 mass % with respect to a total amount based on solid content of the component (a), the component (b), the component (c), and the component (d).

11. The gas barrier laminated film according to claim 2, wherein a content ratio of the polyvinyl alcohol (a) and the ethylene-unsaturated carboxylic acid copolymer (b) is 95:5 to 25:75 in a mass ratio.

12. The gas barrier laminated film according to claim 3 wherein, in the resin layer, at least one of the content ratios (i) to (iii) is satisfied:
   (i) a content ratio [(a)/(b)] of the polyvinyl alcohol (a) and the ethylene-unsaturated carboxylic acid copolymer (b) being 90/10 to 5/95 in a mass ratio;
   (ii) a content ratio of [((a)+(b))/(c)] of the inorganic particles (c) with respect to a total amount of the polyvinyl alcohol (a) and the ethylene-unsaturated carboxylic acid copolymer (b) being 25/75 to 90/10 in a mass ratio; and
   (iii) a content ratio of [(b)/(d)] of the ethylene-unsaturated carboxylic acid copolymer (b) and the cross-linking agent (d) being 98/2 to 40/60 in a mass ratio.

13. The gas barrier laminated film according to claim 1, wherein a thickness of the resin layer is 0.05 to 10 μm.

14. The gas barrier laminated film according to claim 1, further comprising an anchor coat layer between the thermoplastic polymer film and the inorganic thin film.

15. The gas barrier laminated film according to claim 14, wherein the anchor coat layer contains at least one member selected from a polyester resin, an urethane resin, an acrylic resin, an oxazoline group-containing resin, a carbodiimide group-containing resin, an epoxy group-containing resin, an isocyanate group-containing resin, and their copolymers.

16. The gas barrier laminated film according to claim 1, wherein the inorganic thin film comprises at least one member selected from a silicon oxide, an aluminum oxide, and a hydrocarbon.

17. The gas barrier laminated film according to claim 1, wherein the thermoplastic polymer film comprises at least one member selected from polyester, polyamide, and polyvinyl alcohol.

18. A method for producing the gas barrier laminated film of claim 1, comprising at least one of:
   (A) forming an inorganic thin film by vacuum deposition on at least one side of a support film; and
   (B) applying, to a surface of the inorganic thin film, an aqueous dispersion which is obtained by mixing polyvinyl alcohol (a), an ethylene-unsaturated carboxylic acid copolymer (b), and silica particles (c).

19. A method for producing the gas barrier laminated film of claim 1, comprising:
   (A) forming an inorganic thin film by vacuum deposition on at least one side of a support film; and
   (B) applying, to a surface of the inorganic thin film, an aqueous dispersion containing at least one member selected from an ethylene-unsaturated carboxylic acid copolymer (b), silica particles (c), and a cross-linking agent (d).

20. A method for producing the gas barrier laminated film of claim 1, comprising:
   (A) forming an inorganic thin film by vacuum deposition on at least one side of a support film; and
   (B) applying, to a surface of the inorganic thin film, an aqueous dispersion which is obtained by mixing polyvinyl alcohol (a), an ethylene-unsaturated carboxylic acid copolymer (b), inorganic particles (c), and a cross-linking agent (d).

21. The method for producing a laminated film according to any one of claims 18 to 20, wherein heat treatment is performed at 60° C. or higher after the formation of the inorganic thin film, after the formation of the resin layer, or both after the formation of the inorganic thin film and the formation of the resin layer.

22. A gas barrier laminate, wherein at least one member selected from plastic films and paper is laminated on the laminated film according to any one of claims 2 or 1.

23. The laminate according to claim 22, comprising: a support film including a biaxially stretched polyester film; and an oxygen permeability after performing hot water treatment at 95° C. for 30 minutes of 30 cc/m$^2$/24 hr/MPa or less;
   the laminate being obtained by laminating a 30 to 200 μm thick unstretched polypropylene film to a surface of the resin layer of the laminated film or successively laminating a 5 to 10 μm thick biaxially stretched nylon 6 film and the 30 to 200 μm thick unstretched polypropylene film to a surface of the resin layer of the laminated film.

24. The laminate according to claim 22, comprising:
   a support film including a biaxially stretched polyester film; and
   an oxygen permeability after performing hot water treatment at 120° C. for 30 minutes of 20 cc/m$^2$/24 hr/MPa (10 fmol/m$^2$/s/Pa) or less,
   the laminate being obtained by laminating a 30 to 200 μm thick unstretched polypropylene film to a surface of the resin layer of the laminated film or successively laminating a 5 to 10 μm thick biaxially stretched nylon 6 film and the 30 to 200 μm thick unstretched polypropylene film to a surface of the resin layer of the laminated film.

25. The laminate according to claim 22, comprising:
   a support film including a biaxially stretched polyamide film; and
   an oxygen permeability after performing hot water treatment at 95° C. for 30 minutes of 20 cc/m$^2$/24 hr/MPa or less,
   the laminate being obtained by laminating a 5 to 10 μm thick biaxially stretched polyester film to a surface side of the resin layer of the laminated film and laminating a 30 to 200 μm thick unstretched polypropylene film to a surface side of the support film.

26. The laminate according to claim 22, comprising:
   a support film including a biaxially stretched polyamide film; and
   an oxygen permeability after performing hot water treatment at 120° C. for 30 minutes of 20 cc/m$^2$/24 hr/MPa or less,
   the laminate being obtained by laminating a 5 to 10 μm thick biaxially stretched polyester film to a surface side of the resin layer of the laminated film and laminating a 30 to 200 μm thick unstretched polypropylene film to a surface side of the support film.

27. The gas barrier laminated film according to claim 1, wherein the average particle diameter of the inorganic particles (c) has an upper limit of 10 nm.

28. The gas barrier laminated film according to claim 1, wherein the average particle diameter of the inorganic particles (c) has an upper limit of 5 nm.

* * * * *